US012749782B2

(12) United States Patent
Xiong et al.

(10) Patent No.: US 12,749,782 B2
(45) Date of Patent: Sep. 29, 2026

(54) ENERGY STORAGE DEVICE AND ELECTRIC DEVICE

(71) Applicant: Hithium Tech HK Limited, HongKong (CN)

(72) Inventors: Yongfeng Xiong, Shenzhen (CN); Zhixiong Chen, Shenzhen (CN); Lixuan Huang, Shenzhen (CN)

(73) Assignee: HITHIUM TECH HK LIMITED, Hongkong (CN)

( * ) Notice: Subject to any disclaimer, the term of this patent is extended or adjusted under 35 U.S.C. 154(b) by 521 days.

(21) Appl. No.: 18/533,214

(22) Filed: Dec. 8, 2023

(65) Prior Publication Data

US 2024/0405385 A1 Dec. 5, 2024

(30) Foreign Application Priority Data

May 31, 2023 (CN) ........................ 202310635163.6

(51) Int. Cl.
*H01M 50/566* (2021.01)
*H01M 50/103* (2021.01)
(Continued)

(52) U.S. Cl.
CPC ....... *H01M 50/566* (2021.01); *H01M 50/103* (2021.01); *H01M 50/538* (2021.01);
(Continued)

(58) Field of Classification Search
CPC ........ H01G 11/10; H01G 11/74; H01G 11/76; H01G 11/82; H01M 2220/20;
(Continued)

(56) References Cited

U.S. PATENT DOCUMENTS

2018/0269457 A1 9/2018 Kawate et al.
2021/0234175 A1 7/2021 Chen et al.

FOREIGN PATENT DOCUMENTS

CN 108428847 A * 8/2018 ........ H01M 10/0431
CN 209658320 U 11/2019
(Continued)

OTHER PUBLICATIONS

First Office Action dated Dec. 9, 2024 received in corresponding patent family application No. TW112147326. English translation attached.

(Continued)

*Primary Examiner* — Lingwen R Zeng

(57) ABSTRACT

Provided are an energy storage device and an electric device. The energy storage device includes a connector, a tab, and a welding protection sheet. The tab is connected to the connector. The welding protection sheet abuts against a surface of the tab away from the connector. The welding protection sheet includes a body, a first bent connection portion, and a first extending portion. The first bent connection portion is connected between the first extending portion and the body, and the first extending portion is foldable relative to the body to face towards the body. An end portion of the first extending portion away from the first bent connection portion has a first notch. The first notch has a width less than a width of the first extending portion. A distance between two first corners of the first extending portion is less than a length of the body.

20 Claims, 8 Drawing Sheets

(51) Int. Cl.

| | |
|---|---|
| ***H01M 50/538*** | (2021.01) |
| ***H01M 50/593*** | (2021.01) |
| *H01G 11/10* | (2013.01) |
| *H01G 11/74* | (2013.01) |
| *H01G 11/76* | (2013.01) |
| *H01G 11/82* | (2013.01) |
| *H01M 50/169* | (2021.01) |
| *H01M 50/209* | (2021.01) |
| *H01M 50/516* | (2021.01) |
| *H01M 50/533* | (2021.01) |
| *H01M 50/536* | (2021.01) |
| *H01M 50/55* | (2021.01) |
| *H01M 50/553* | (2021.01) |

(52) U.S. Cl.
CPC .......... *H01M 50/593* (2021.01); *H01G 11/10* (2013.01); *H01G 11/74* (2013.01); *H01G 11/76* (2013.01); *H01G 11/82* (2013.01); *H01M 50/169* (2021.01); *H01M 50/209* (2021.01); *H01M 50/516* (2021.01); *H01M 50/533* (2021.01); *H01M 50/536* (2021.01); *H01M 50/55* (2021.01); *H01M 50/553* (2021.01); *H01M 2220/20* (2013.01); *Y02E 60/10* (2013.01)

(58) Field of Classification Search
CPC ............. H01M 50/103; H01M 50/169; H01M 50/209; H01M 50/516; H01M 50/533; H01M 50/536; H01M 50/538; H01M 50/55; H01M 50/553; H01M 50/566; H01M 50/593; Y02E 60/10
See application file for complete search history.

(56) References Cited

FOREIGN PATENT DOCUMENTS

| | | | | | |
|---|---|---|---|---|---|
| CN | 111029490 A | * | 4/2020 | .......... H01M 50/528 |
| CN | 111987340 A | | 11/2020 | |
| CN | 214244277 U | | 9/2021 | |
| CN | 215998185 U | * | 3/2022 | |
| CN | 115881447 A | | 3/2023 | |
| JP | 2016115409 A | | 6/2016 | |
| JP | 2021046222 A | | 3/2021 | |
| TW | 202320401 A | | 5/2023 | |

OTHER PUBLICATIONS

Examination Report No. 1 dated Feb. 7, 2025 received in corresponding patent family application No. AU2023278087.
Extended European Search Report from corresponding European Application No. EP23215226.4, dated Jun. 17, 2024.
International Search Report and Written Opinion dated Jun. 23, 2023 in International Application No. PCT/CN2023/097652. English Translation attached.
The Grant Notice from corresponding Chinese Application No. 202310635163.6, dated Jul. 10, 2023. English translation attached.

* cited by examiner

ENERGY STORAGE DEVICE AND ELECTRIC DEVICE

CROSS REFERENCE TO RELATED APPLICATION

This application claims priority to Chinese Patent Application No. 202310635163.6 filed on May 31, 2023, the entire disclosure of which is incorporated herein by reference.

FIELD

The present disclosure relates to the field of energy storage technology, and particularly, to an energy storage device and an electric device.

BACKGROUND

With the increasing prominence of environmental issues, a low carbon economy has become the mainstay of future economic development. An increasingly severe air situation has also further fueled the emergence and development of an energy storage device. The energy storage device with high energy density, high power density, a large number of recycling use times, and long storage duration becomes a key to addressing global problems such as energy crisis and environmental pollution.

SUMMARY

Embodiments of the present disclosure provide an energy storage device and an electric device.

In a first aspect, embodiments of the present disclosure provide an energy storage device. The energy storage device includes a connector, a tab, and a welding protection sheet. The tab is connected to the connector. The welding protection sheet abuts against a surface of the tab facing away from the connector. The welding protection sheet includes a body, a first bent connection portion, and a first extending portion. Each of the body and the first extending portion extends in a first direction. The first bent connection portion is connected between the first extending portion and the body. The first extending portion is foldable relative to the body to face towards the body. Each of two opposite ends of an end portion of the first extending portion away from the first bent connection portion in the first direction has a first notch, and the first notch has a width in a second direction less than a width of the first extending portion in the second direction. The second direction is perpendicular to the first direction. Two first corners are formed at connections between two end portions of the first extending portion in the first direction and the end portion of the first extending portion away from the first bent connection portion. A distance between the two first corners in the first direction is less than a length of the body in the first direction.

In a second aspect, embodiments of the present disclosure provide an electric device. The electric device includes the energy storage device according to any one of the above embodiments. The energy storage device is configured to supply electric energy to the electric device, thereby prolonging a service life of the electric device.

BRIEF DESCRIPTION OF THE DRAWINGS

In order to clearly explain technical solutions according to the embodiments of the present disclosure, drawings used in the description of the embodiments are briefly described below. Obviously, the drawings described below are merely some embodiments of the present disclosure. Based on these drawings, other drawings can be obtained by those skilled in the art without creative effort.

Figure 1:
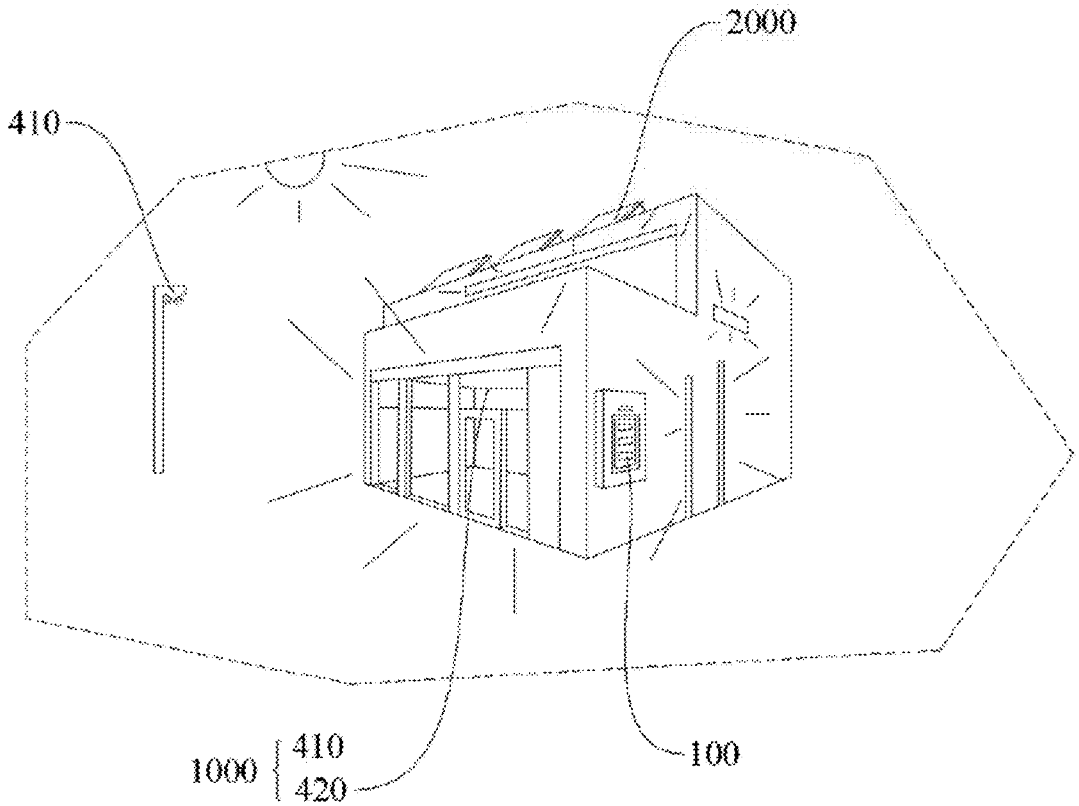
FIG. 1 is a view of an energy storage device in a household energy storage scene according to an embodiment of the present disclosure.

Reference numerals in the drawings are described below.

load device—1000; electric energy conversion device—2000; street lamp—410; household appliance—420; battery pack 300; case body—310; case cover—320; energy storage device—100; housing—110; end cover—120; pole—121; electrode assembly 130; tab—131; first tab portion—1311; second tab portion—1312; connector—150; welding protection sheet—160; body—161; first bent connection portion—162; second bent connection portion—163; first extending portion—164; first side wall—1641; second side wall—1642; first surface—1643; first corner—1644; second extending portion—165; third side wall—1651; fourth side wall—1652; third surface—1653; second corner—1654; first notch—166; first notch wall—1661; second notch wall—1662; second notch—167; third notch wall—1671; fourth notch wall—1672; avoidance space—1601; resistance increasing region—1602; stop portion—168; second surface—1681; bent notch—1682; welding region—169; welding spot—1691.

The present disclosure is further described according to the following specific implementations in combination with the accompanying drawings.

DETAILED DESCRIPTION

Technical solutions according to embodiments of the present disclosure will be described below in combination with accompanying drawings of the embodiments of the present disclosure. Obviously, the embodiments described below are only a part, rather than all, of the embodiments of the present disclosure. On the basis of the embodiments in the present disclosure, all other embodiments obtained by those of ordinary skill in the art without creative labor shall fall within the scope of the present disclosure.

In the present disclosure, reference to "embodiment" or "implementation" means that a particular feature, structure, or characteristic described in conjunction with the embodiment or implementation may be included in at least one embodiment of the present disclosure. The presence of the term at each place in the specification does not necessarily refer to the same embodiment, nor does it refer to a separate or alternative embodiment that is mutually exclusive of other embodiments. It should be understood by those skilled in the art, both explicitly and implicitly, that the embodiments described herein may be combined with other embodiments.

It should be noted that terms used in the specification and claims of the present disclosure and the accompanying drawings are only for describing specific embodiments, and are not intended to limit the present disclosure. It should be noted that terms "first" and "second" in the specification and claims of the present disclosure and the accompanying drawings are used to distinguish different objects, rather than to describe a specific sequence. It should also be understood that the term "and/or" as used in the specification and claims of the present disclosure refers to and may include inclusion of any or all possible combinations of one or more associated listed items.

Since energy demands for users have strong temporal and spatial properties. In order for rational utilization of energy and an improvement in a utilization rate of energy, it is needed to employ a medium or device to store energy of one form or of another form converted from one form and then release the stored energy in a specific form of energy based on the demands of forthcoming applications. It is common knowledge that, in order to achieve the ambitious goal of carbon neutrality, a principal pathway for generating green electric energy currently is to develop green electric energy such as photovoltaic energy, wind power, and the like to replace fossil energy. Currently, the generation of green electric energy is often dependent on photovoltaic energy, wind power, potential energy of water, and the like. However, wind energy and solar energy generally pose challenges due to their intermittent nature and great fluctuating nature, which would result in grid instability, with insufficient electricity during peak demand and electricity excess during off-peak periods. In addition, unstable voltage may also cause damage to the power system. Therefore, insufficient electricity demand or inadequate grid capacity may lead to the problem of "Forced Abandonment of Wind and Light". To address these challenges, energy storage is crucial, i.e., the electric energy is stored by converting the electric energy into other forms of energy through physical or chemical means and released when needed by converting it back into the electric energy. In a nutshell, energy storage can be likened to a large-scale "power bank" that stores the electric energy during times when photovoltaics and wind power are abundant, and releases the stored electricity when needed.

By taking electrochemical energy storage as an example, embodiments of the present disclosure provide an energy storage device 100 internally provided with a chemical battery that mainly utilizes chemical elements within it as an energy storage medium, accompanied by chemical reactions or transformations of the storage medium during charging and discharging of the battery. In simple terms, electric energy generated by wind energy and solar energy is stored in the chemical battery. In a case where the use of external electric energy reaches a peak, the stored electric energy is released for use or is transferred to a place where the electric quantity is scarce for use.

Currently, energy storage (i.e., energy storage) finds extensive applications in various scenes, including power-generation-side energy storage, grid-side energy storage, renewable energy grid-connected energy storage, and user-side storage. The corresponding energy storage device 100 includes types as described below.

(1) The device 100 includes a large-scale energy storage container applied in a grid-side energy storage scene. The container, serving as high-quality active and reactive power regulation sources in the power grid, realizes load matching of electric energy in time and space, enhances renewable energy absorption and consumption capability, and is of great significance in aspects like standby of a power grid system, alleviation of peak-load power supply pressure, and peak regulation and frequency modulation.

(2) The device 100 includes a small and medium-sized energy-saving electric cabinets applied in user-side industrial and commercial energy storage scenes (banks, shopping malls, and the like) and a household small energy storage box applied in a user-side household energy storage scene, with a main operating mode being "peak shaving and valley filling". Since there is a significant price difference in electricity charges during off-peak periods of power consumption demands, customers having energy storage devices typically charge them during low-price periods of the electricity charges to reduce costs. Then, during high-price periods of the electricity charges, they draw on the electricity stored in the energy storage device to save on electricity expenses. In addition, in remote areas or regions with frequent natural disasters like earthquakes and hurricanes, the presence of household energy storage devices serves as backup power sources for users themselves and the power grid, dispensing with convenience of frequent power failures caused by disasters or other factors.

According to embodiments of the present disclosure, a household energy storage scene in the user-side energy storage is taken as an example for description. FIG. 1 is a view of a household energy storage scene of an energy storage device 100 according to an embodiment of the present disclosure. The energy storage device 100 in the present disclosure is not limited to the household energy storage scene.

Embodiments of the present disclosure provide a household energy storage system including an electric energy conversion device 2000, a user load, and an energy storage device 100. The electric energy conversion device 2000 may be a photovoltaic panel. The user load is a load device 1000 that needs to be powered. The energy storage device 100 can supply electric energy to the electric device. The load device 1000 may be a street lamp 410, a household appliance 420, or the like. The energy storage device 100 is a small energy storage box, which can be mounted at an outdoor wall in a wall-mounted manner. In an exemplary, the photovoltaic panel can convert the solar energy into the electric energy in the valley period of electricity charges. The energy storage device 100 is used for storing the electric energy and supplying the electric energy to the street lamp 410 and the household appliance 420 for use in a case where the electricity price peak occurs or supplying power in the event of power grid outages or blackouts.

It can be understood that the energy storage devices 100 may include, but are not limited to, a single battery, a battery module, a battery pack, a battery system, and the like. In a case where the energy storage device 100 is the single battery, the energy storage device 100 may be of a square shape.

In the present disclosure, for clear description, an X-axis direction is defined as a first direction, a Y-axis direction is defined as a second direction, and a Z-axis direction is defined as a third direction. Two of the first direction X, the second direction Y, and the third direction Z are perpendicular to each other.

Figure 2:
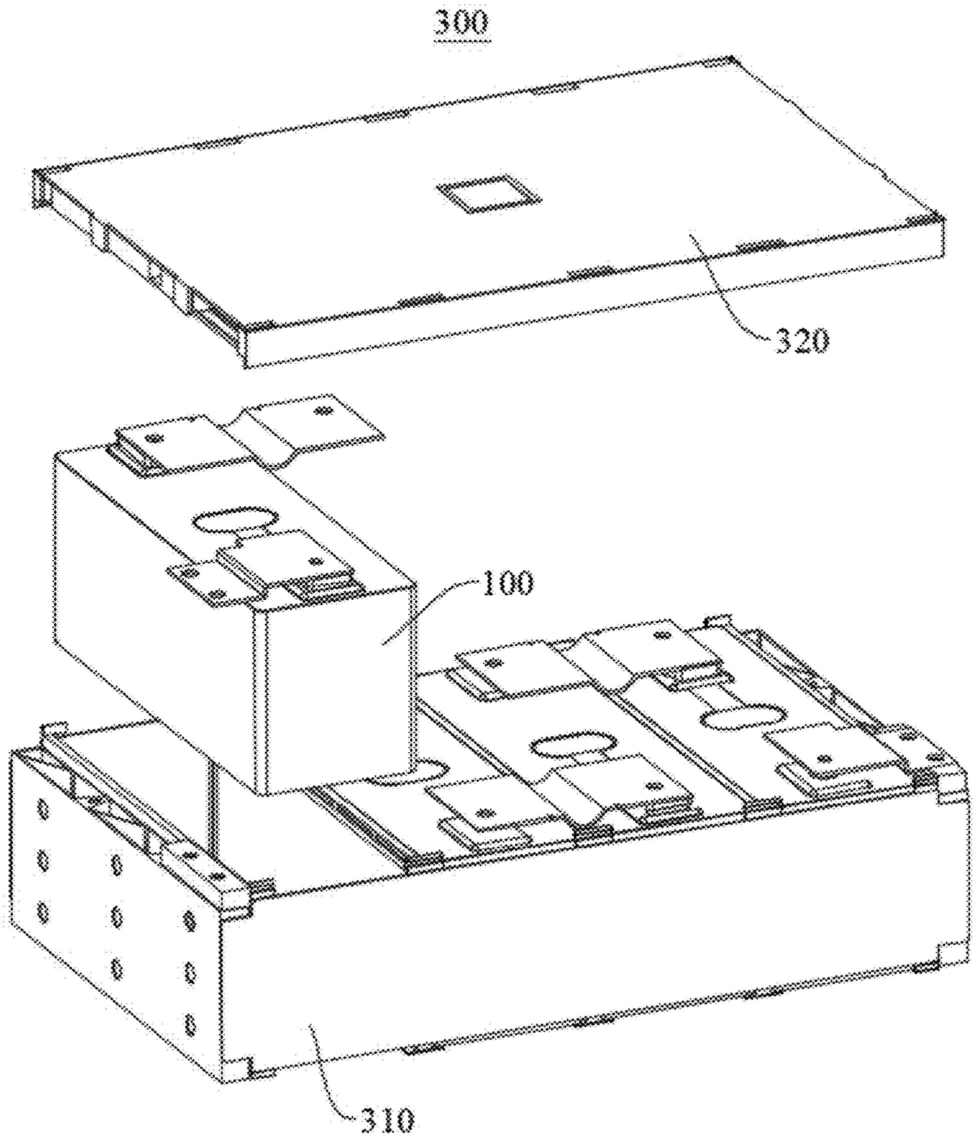
FIG. 2 is an exploded view of a battery pack according to an embodiment of the present disclosure.

FIG. 2 is an exploded view of a battery pack 300 according to an embodiment of the present disclosure. Referring to FIG. 2, the battery pack 300 includes a case body 310, a case cover 320, and an energy storage device 100. The energy storage device 100 is accommodated in the case body 310, and the case cover 321 coves and seals the case body 310. An accommodation space is enclosed between the case body 310 and the case cover 320, and the energy storage device 100 is accommodated in the accommodation space. A plurality of energy storage devices 100 may be provided and connected in parallel or series.

The energy storage device typically includes an electrode assembly, a connector, a welding protection sheet, and a pole. The electrode assembly is provided with a tab. The tab is located between the connector and the welding protection sheet. The connector is welded to the pole. However, the existing welding protection sheet suffers from low alignment efficiency and poor alignment precision when being welded to the tab, resulting in low efficiency and poor reliability of the energy storage device.

Figure 3:
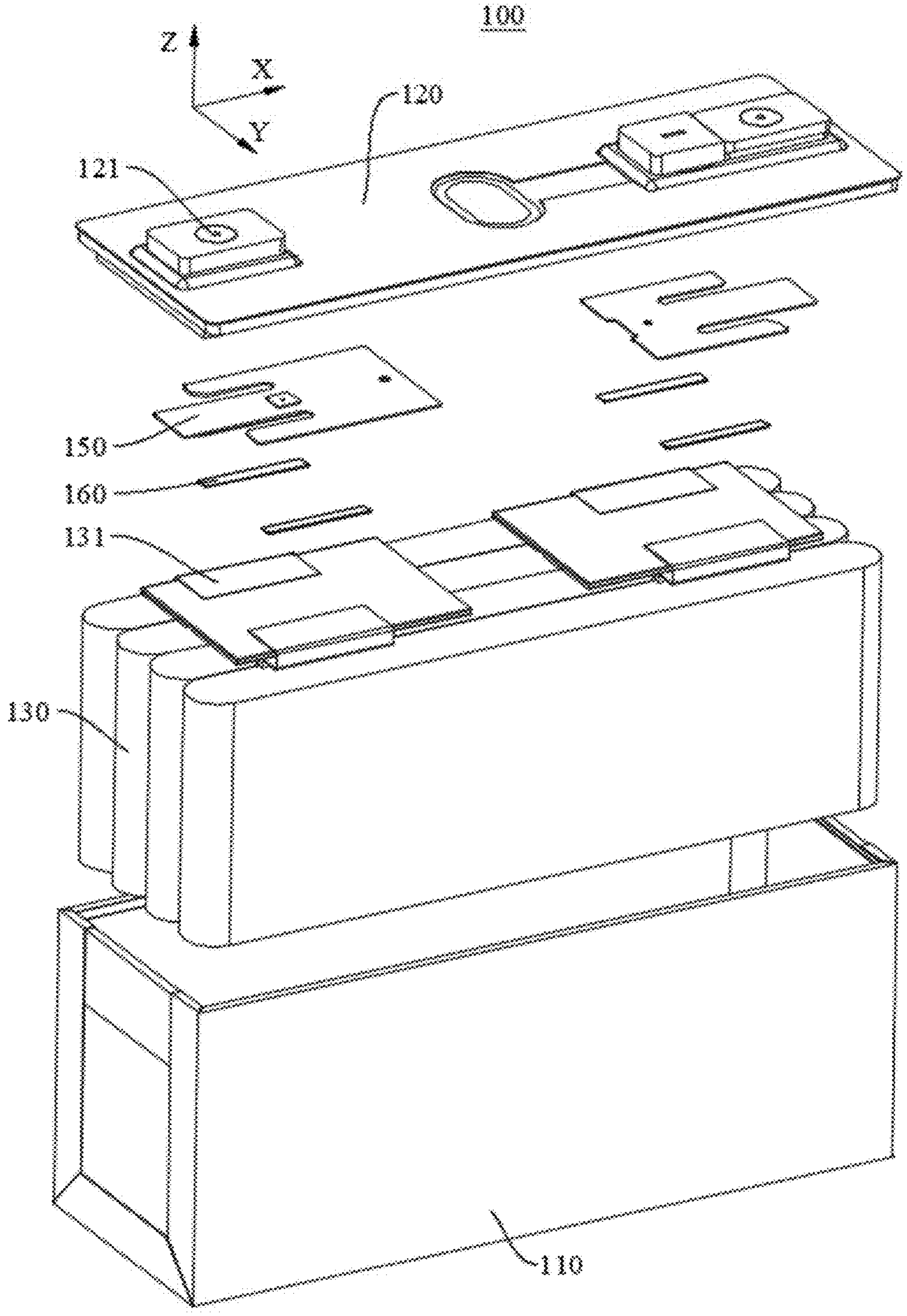
FIG. 3 is an exploded view of an energy storage device according to an embodiment of the present disclosure.

FIG. 3 is an exploded view of an energy storage device 100 according to an embodiment of the present disclosure. Referring to FIG. 3, the energy storage device 100 includes a housing 110, an end cover 120, an electrode assembly 130, and a connector 150. An accommodation space is enclosed between the housing 110 and the end cover 120, and the electrode assembly 130 is accommodated in the accommodation space. A plurality of electrode assemblies 130 may be provided and is stacked together. The end cover 120 is also provided with a pole 121. The electrode assembly 130 is electrically connected to the pole 121 through the connector 150 to allow the energy storage device 100 to output electric energy through the pole 121.

Figure 4:
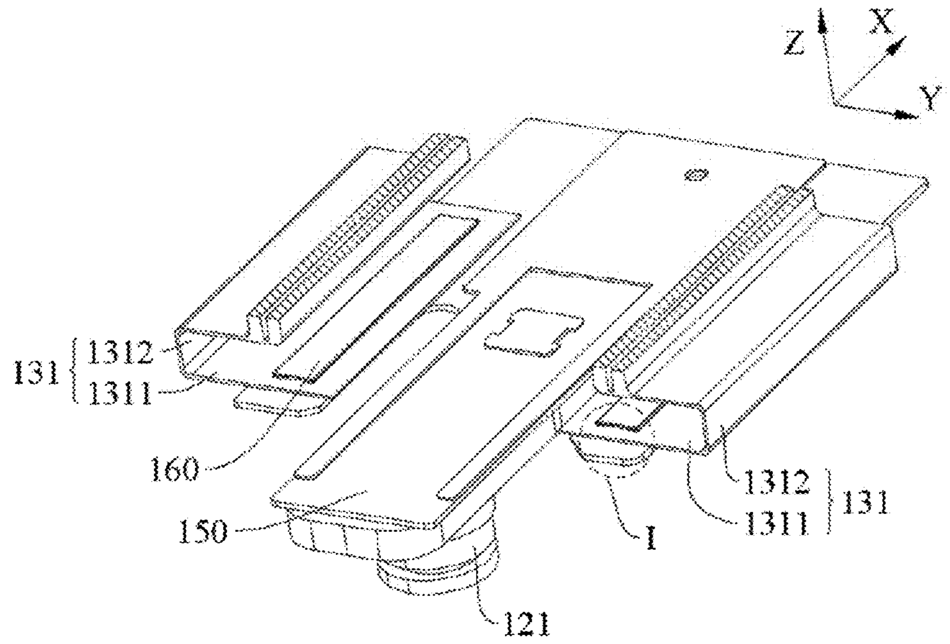
FIG. 4 is a schematic structural view of an energy storage device according to an embodiment of the present disclosure.
Figure 5:
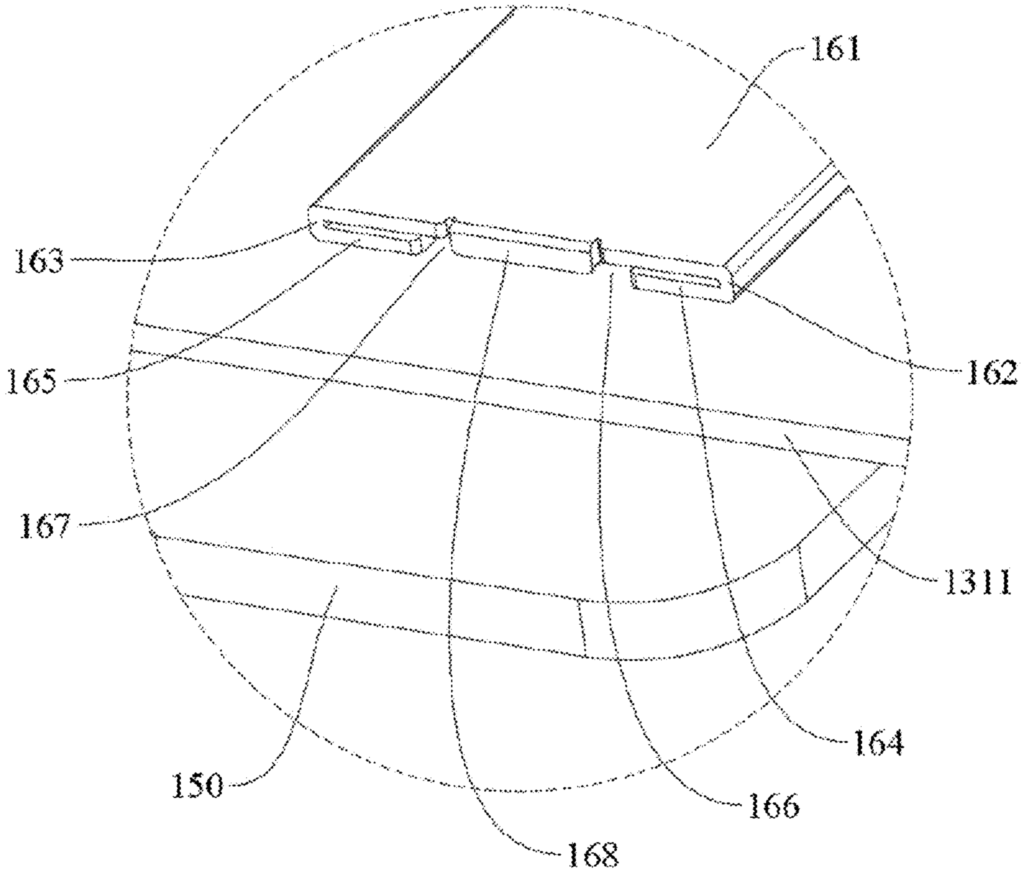
FIG. 5 is an enlarged view of a part I of FIG. 4.
Figure 6:
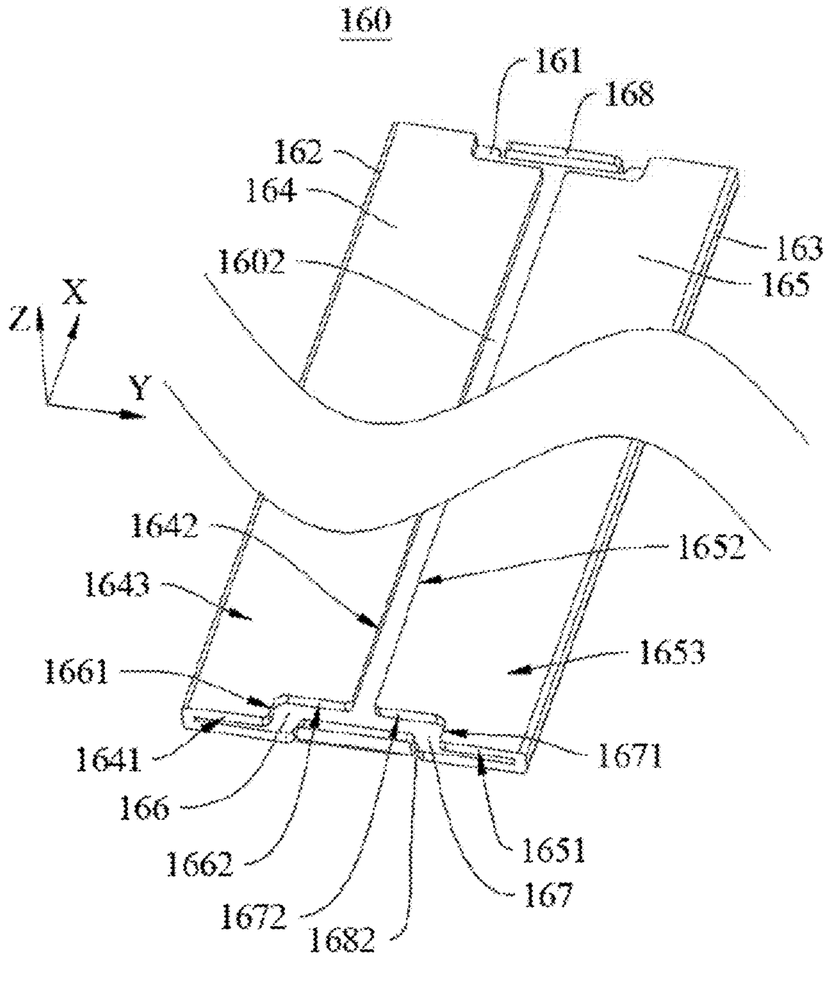
FIG. 6 is a schematic structural view of a welding protection sheet according to an embodiment of the present disclosure in a first direction.
Figure 7:
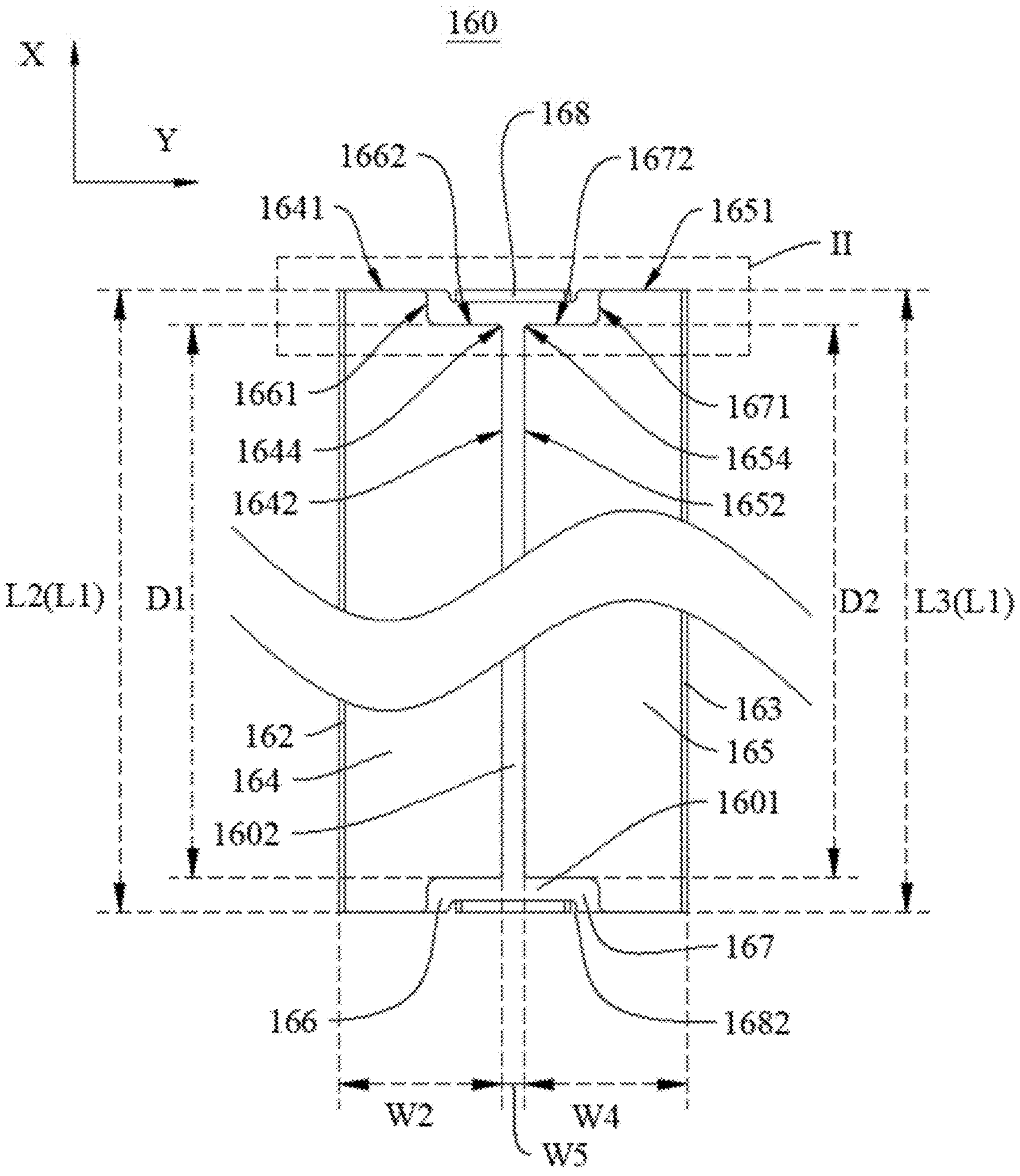
FIG. 7 is a schematic structural view of a welding protection sheet according to an embodiment of the present disclosure in a second direction.
Figure 8:
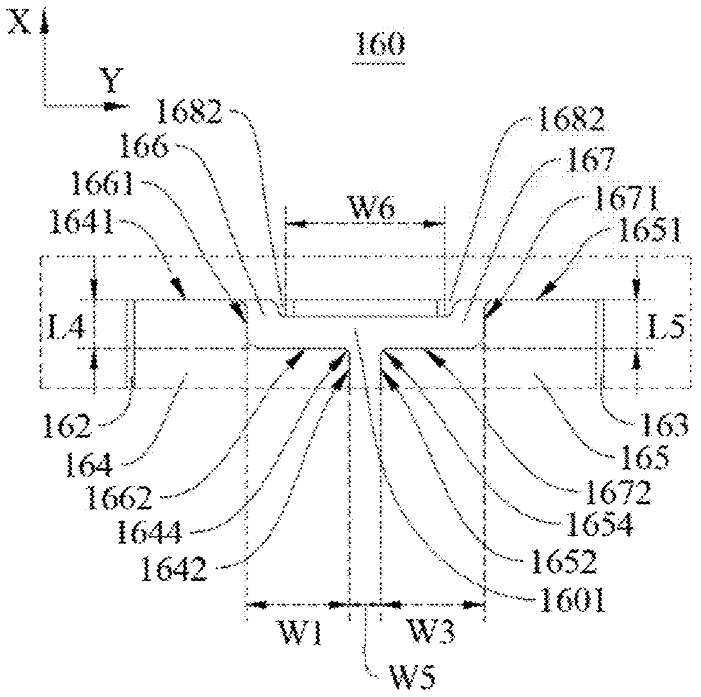
FIG. 8 is an enlarged view of a part II of FIG. 7.

FIG. 4 is a schematic structural view of an energy storage device 100 according to an embodiment of the present disclosure. FIG. 5 is an enlarged view of a part I of FIG. 4. FIG. 6 is a schematic structural view of a welding protection sheet 160 according to an embodiment of the present disclosure a first direction. FIG. 7 is a schematic structural view of a welding protection sheet 160 according to an embodiment of the present disclosure in a second direction. FIG. 8 is an enlarged view of a part II of FIG. 7. Referring to FIG. 4 to FIG. 8, the electrode assembly 130 is provided with a tab 131 to be connected to the connector 150. The connector 150 is connected to the pole 121 and the tab 131, respectively. The welding protection sheet 160 abuts against a surface of a side of the tab 131 facing away from the connector 150. The welding protection sheet 160 is configured to prevent the tab 131 from being welding penetrated by a welding die head in a case where the tab 131 is welded to the connector 150 and to enhance strength of a connection between the tab 131 and the connector 150 after welding. In an exemplary embodiment of the present disclosure, the tab 131 includes a first tab portion 1311 and a second tab portion 1312 connected to the first tab portion 1311. The first tab portion 1311 is located between the welding protection sheet 160 and the connector 150. The second tab portion 1312 is bent relative to the first tab portion 1311 away from the connector 150. The second tab portion 1312 is connected to the electrode assembly 130.

The welding protection sheet 160 includes a body 161, a first bent connection portion 162, and a first extending portion 164. The body 161 and the first extending portion 164 extend in a first direction X, respectively. A length L1 of the body 161 in the first direction X is same as a length L2 of the first extending portion 164 in the first direction X. The first bent connection portion 162 is connected between the first extending portion 164 and the body 161. The first extending portion 164 is foldable relative to the body 161 to face towards the body 161. In this way, the welding protection sheet 160 has a double-layer structure, thereby improving overall strength of the welding protection sheet 160. As a result, it is possible to prevent the welding protection sheet 160 from being bent during transportation or mounting, and strength of a connection between the welding protection sheet 160 and the tab 131 is improved. Therefore, it is possible to allow the connector 150, the tab 131, and the welding protection sheet 160 to be welded together more stably, thereby improving reliability of the energy storage device 100.

The body 161, the first bent connection portion 162, and the first extending portion 164 may be integrally formed. The welding protection sheet 160 may be manufactured through stamping, folding, and other processes. The integrated structure can simplify the manufacturing processes of the welding protection sheet 160 without additional connection structures, thereby lowering manufacturing cost of the welding protection sheet 160. The first extending portion 164 is foldable relative to the body 161 to face towards the body 161. The first bent connection portion 162 is formed at a bending between the first extending portion 164 and the body 161. The first bent connection portion 162 may be in a C shape. The first bent connection portion 162 is located at a side of the body 161 close to the second tab portion 1312. After the first extending portion 164 is bent relative to the body 161, a rounded transition is naturally achieved at the first bent connection portion 162, ensuring no burrs on the first bent connection portion 162. Therefore, the second tab portion 1312 would not be punctured or pierced by the burrs when being bent relative to the first tab portion 1311, thereby improving the reliability of the energy storage device 100.

Each of two opposite ends of an end portion of the first extending portion 164 away from the first bent connection portion 162 in the first direction X has a first notch 166. An edge part of the body 161 is exposed through the notch 166. A width W1 of the first notch 166 in a second direction Y is less than a width W2 of the first extending portion 164 in the second direction Y, the second direction Y is perpendicular to the first direction X. Two first corners 1644 are formed at connections between two end portions of the first extending portion 164 in the first direction X and the end portion of the first extending portion 164 away from the first bent connection portion 162. A distance D1 between the two first corners 1644 in the first direction X is less than a length L1 of the body 161 in the first direction X. In this embodiment, the first extending portion 164 is foldable relative to the body 161 to face towards the body 161. In addition, the end of the first extending portion 164 away from the first bent connection portion 162 has the first notch 166. The distance D1 of the two first corners 1644 in the first direction X is less than the length L1 of the body 161 in the first direction X. In this way, on the one hand, a robotic arm may reach the first notch 166 and clamp the welding protection sheet 160, thereby stably clamping the welding protection sheet 160. The first notch 166 may also provide positioning for robotic arm to allow a position of the robotic arm to keep relatively consistent with a position of the welding protection sheet 160. Therefore, it is possible to allow for rapid and accurate placement of the welding protection sheet 160 at a specified position on the tab 131 by the robotic arm. As a result, alignment efficiency and precision between the welding protection sheet 160 and the tab 131 can be improved, thereby improving production efficiency and product reliability of the energy storage device 100. Meanwhile, displacement of the welding protection sheet 160 on the tab 131 can be avoided, thus avoiding problems such as solder false and leakage of solder between the welding protection sheet 160 and the tab 131. On the other hand, the first notch 166 can allow an edge part of each of the two ends of the body 161 in the first direction X to be exposed relative to the first extending portion 164, i.e., the first notch 166 can allow the first corner 1644 to shrink inwards relative to the body 161 in the first direction X to reduce contact between the first corner 1644 and the tab 131, thereby effectively preventing the tab 131 from being damaged by the first corner 1644. Therefore, reliability of the energy storage device 100 can be improved, and a service life of the energy storage device 100 can be prolonged. Further, the inward shrinking of the first corners 1644 relative to the body 161 in the first direction X can also reduce the possibility of the first corners 1644 coming into contact with other objects, which can avoid the upwarp of the first corners 1644 away from the body 161 due to an external force. Therefore, it is possible to prevent the first corners 1644 from being formed into sharp portions that could pierce or scratch the tab 131. In addition, the robotic arm can clamp the welding protection sheet 160 in the first direction X to facilitate releasing the welding protection sheet 160 after placing the welding protection sheet 160 onto the tab 131. In this embodiment, the welding protection sheet 160 is clamped and placed at the specified position on the tab 131 by the robotic arm. Compared with manual placement, placement efficiency and precision of the welding protection sheet 160 are significantly improved, thus greatly improving the production efficiency of the energy storage device 100 and lowering production costs.

A length L2 of the first extending portion 164 in the first direction X ranges from 22 mm to 30 mm, and the width W2 of the first extending portion 164 in the second direction Y ranges from 3 mm to 9 mm, therefore, it is possible to allow for sufficient welding area between the welding protection sheet 160 and the tab 131 at a position corresponding to the first extending portion 164, thus ensuring that the welding protection sheet 160 and the tab 131 have sufficient connection strength, to improve safety and reliability of the energy storage device 100. For example, the length L2 of the first extending portion 164 may be 22 mm, 24 mm, 26 mm, 28 mm, 30 mm, or the like. The width W2 of the first extending portion 164 may be 3 mm, 5 mm, 7 mm, 9 mm, or the like. The first extending portion 164 has a length L2 less than 22 mm and a width W2 less than 3 mm, which easily results in a small welding area between the welding protection sheet 160 and the tab 131, leading to insufficient strength of the connection between the welding protection sheet 160 and the tab 131, thereby impacting the reliability and service life of the energy storage device 100. The first extending portion 164 has a length L2 greater than 30 mm and a width W2 greater than 9 mm, which is unfavorable for the compact design of the energy storage device 100, resulting in a low energy density of the energy storage device 100.

In this embodiment, the welding protection sheet 160 further includes a second bent connection portion 163 and a second extending portion 165. The second extending portion 165 extends in the first direction X. A length L3 of the second extending portion 165 in the first direction X is the same as the length L1 of the body 161 in the first direction X. The second bent connection portion 163 is connected to an end of the body 161 away from the first bent connection portion 162. The second bent connection portion 163 is connected between the second extending portion 165 and the body 161. The second extending portion 165 is foldable relative to the body 161 to face towards the body 161. In addition, the second extending portion 165 is located at a side of the body 161 facing towards the first extending portion 164. In this way, the welding protection sheet 160 is formed into a double-layer structure, thereby improving the overall strength of the welding protection sheet 160. In addition, it is possible to prevent the welding protection sheet 160 from being bent during transportation or installation, and the strength of the connection between the welding protection sheet 160 and the tab 131 is improved, which enables the connector 150, the tab 131, and the welding protection sheet 160 to be more stably welded together, thereby improving the reliability of the energy storage device 100.

Here, the body 161, the second bent connection portion 163, and the second extending portion 165 may be integrally formed, to simplify the manufacturing processes of the welding protection sheet 160, thus lowering the manufacturing cost of the welding protection sheet 160. The second extending portion 165 faces towards the body 161 after being folded relative to the body 161. The second bent connection portion 163 is formed at a bending between the second extending portion 165 and the body 161. The second bent connection portion 163 may be in a C shape. After the second extending portion 165 is bent relative to the body 161, a rounded transition is naturally achieved at the position of the second bent connection portion 163, ensuring no burrs on the second bent connection portion 163. Therefore, no damage is caused to the tab 131, thereby improving the reliability of the energy storage device 100.

Each of two opposite ends of an end portion of the second extending portion 165 away from the second bent connection portion 163 in the first direction X has a second notch 167. The second notch 167 faces towards the first notch 166 in the second direction Y. A width W3 of the second notch 167 in a second direction Y is less than a width W4 of the second extending portion 165 in the second direction Y. The the second extending portion 165 has two second corners 1654. The two second corners 1654 are formed at connections between two end portions of the second extending portion 165 in the first direction X and the end portion of the second extending portion 165 away from the second bent connection portion 163. A distance D2 between the two second corners 1654 in the first direction X is less than a length L1 of the body 161 in the first direction X. In this embodiment, the second extending portion 165 is foldable relative to the body 161 to face towards the body 161. In addition, an end of the second extending portion 165 away from the second bent connection portion 163 has the second notch 167. The distance D2 of the two second corners 1654 in the first direction X is less than the length L1 of the body 161 in the first direction X. In this way, on the one hand, when clamping the welding protection sheet 160, the robotic arm can simultaneously reach the first notch 166 and the second notch 167 to clamp the welding protection sheet 160. The first notch 166 and the second notch 167 can provide the robotic arm with several clamping positions, to increase an acting point of the robotic arm. Therefore, the robotic arm can clamp the welding protection sheet 160 more steadily.

The first notch 166 and the second notch 167 can also provide the robotic arm with positioning, allowing a position of the robotic arm to keep relatively consistent with the position of the welding protection sheet 160. In this way, it is possible to allow for rapid and accurate placement of the welding protection sheet 160 onto the specified position of the tab 131 by the robotic arm. Therefore, the alignment efficiency and precision between the welding protection sheet 160 and the tab 131 can be improved, which in turn improves the production efficiency and the product reliability of the energy storage device 100. Meanwhile, the displacement of the welding protection sheet 160 above the tab 131 can be avoided, thus avoiding the problems solder false and solder leakage between the welding protection sheet 160 and the tab 131. On the other hand, the second notch 167 can allow the body 161 to be exposed at an edge part of each of the two ends of the second notch 167 in the first direction X relative to the second extending portion 165, i.e., the second notch 167 can allow the second corner 1654 to shrink inwards relative to the body 161 in the first direction X, to reduce contact between the second corner 1654 and the tab 131, thereby effectively preventing the tab 131 from being damaged by the second corner 1654 and further improving the reliability of the energy storage device 100 and prolonging the service life of the energy storage device 100. Further, the inward shrinking of the second corners 1654 relative to the body 161 in the first direction X can also reduce the possibility of the second corners 1654 coming into contact with other objects, which avoids the upwarp of the second corner 1654 away from the body 161 due to an external force, thereby preventing the second corners 1654 from being formed into sharp portions that could pierce or scratch the tab 131. In some implementations, the shapes of the first notch 166 and the second notch 167 may be configured to be different from or the same as each other.

In some embodiments, the second bent connection portion 163 may be located at the side of the body 161 close to the second tab portion 1312. In a case where the welding protection sheet 160 is welded to the tab 131, the welding protection sheet 160 may not distinguish mounting directions of the first bent connection portion 162 and the second bent connection portion 163, thereby reducing welding steps for the welding protection sheet 160 and the tab 131. Therefore, welding efficiency can be improved. In addition, welding errors are avoided, and a production yield of the energy storage device 100 is improved. In some embodiments, the first extending portion 164 and the second extending portion 165 may be symmetrically arranged relative to the body 161, to reduce the manufacturing processes of the welding protection sheet 160, thereby increasing the welding efficiency between the welding protection sheet 160 and the tab 131.

A length L3 of the second extending portion 165 in the first direction X ranges from 22 mm to 30 mm, and the width W4 of the second extending portion 165 in the second direction Y ranges from 3 mm to 9 mm. In this way, it is possible to allow for sufficient welding area between the welding protection sheet 160 and the tab 131 at a position corresponding to the second extending portion 165, thus ensuring that the welding protection sheet 160 and the tab 131 have sufficient connection strength, to improve the safety and reliability of the energy storage device 100. For example, the length L3 of the second extending portion 165 may be 22 mm, 24 mm, 26 mm, 28 mm, 30 mm, or the like. The width W4 of the second extending portion 165 may be 3 mm, 5 mm, 7 mm, 9 mm, or the like. The second extending portion 165 has a length L3 less than 22 mm and a width W4 less than 3 mm, which easily results in the small welding area between the welding protection sheet 160 and the tab 131, leading to the insufficient strength of the connection between the welding protection sheet 160 and the tab 131, thereby impacting the reliability and service life of the energy storage device 100. The second extending portion 165 has a length L3 greater than 30 mm and a width W4 greater than 9 mm, which is unfavorable for the compact design of the energy storage device 100, resulting in the low energy density of the energy storage device 100.

The first extending portion 164 has two first side walls 1641 opposite to each other in the first direction X and a second side wall 1642 located at a side away from the first bent connection portion 162. The first notch 166 has a first notch wall 1661 connected to the two first side walls 1641 and a second notch wall 1662 connected to the second side wall 1642. A rounded transition is achieved between the first sidewall 1641 and the first notch wall 1661, a rounded transition is achieved between the second sidewall 1642 and the second notch wall 1662, and a rounded transition is achieved between the first notch wall 1661 and the second notch wall 1662. Therefore, it is possible to reduce sharp corners on the first extending portion 164, to prevent the first extending portion 164 from damaging the tab 131, which in turn improves the reliability of the energy storage device 100 and prolongs service life of the energy storage device 100. The first corner 1644 is formed at a connection between the second notch wall 1662 and the second side wall 1642. The first corner 1644 is constructed as a rounded corner. The distance D1 between the two first corners 1644 in the first direction X may be a distance between the second notch walls 1662 in the two first notches 166.

The second extending portion 165 has two third side walls 1651 opposite to each other in the first direction X and a fourth side wall 1652 located at a side of the second extending portion 165 away from the second bent connection portion 163. The second notch 167 has a third notch wall 1671 connected to the two third side walls 1651 and a fourth notch wall 1672 connected to the fourth side wall 1652. A rounded transition is achieved between the third sidewall 1651 and the third notch wall 1671, a rounded transition is achieved between the fourth sidewall 1652 and the fourth notch wall 1672, and a rounded transition is achieved between the third notch wall 1671 and the fourth notch wall 1672. In this way, it is possible to reduce sharp corners on the second extending portion 165, to prevent the second extending portion 165 from damaging the tab 131, which in turn improves the reliability of the energy storage device 100 and prolongs the service life of the energy storage device 100. The second corner 1654 is formed at a connection between the fourth notch wall 1672 and the fourth side wall 1652. The second corner 1654 is constructed as a rounded corner. The distance D2 between the two second corners 1654 in the first direction X may be a distance between the fourth notch walls 1672 in the two second notches 167.

In some implementations, the second notch wall 1662 and the first side wall 1641 are arranged in parallel, and the fourth notch wall 1672 and the third side wall 1651 are arranged in parallel. In this way, it is possible to prevent the robotic arm from slipping in a case where the second notch wall 1662 abuts against the fourth notch wall 1672, which allows the robotic arm to easily exert enough clamping force to the welding protection sheet 160, thereby allowing the robotic arm to clamp the welding protection sheet 160 more reliably. In some implementations, the second notch wall 1662 and the fourth notch wall 1672 each are configured as a flat surface to avoid the slipping of the robotic arm in the case where the second notch wall 1662 abuts against the fourth notch wall 1672.

In some embodiments, an obtuse angle is formed between the first notch wall 1661 and the second notch wall 1662. In this way, a smoother transition between the first notch wall 1661 and the second notch wall 1662 is achieved, thereby reducing the internal stress of the first extending portion 164 near the corresponding first notch 166 after stamping the first notch 166. Consequently, a problem such as the upwarp of the first corner 1644 of the first extending portion 164 after stamping can be further avoided, thus preventing the first corner 1644 from scratching the tab 131. Therefore, it is possible to increase the reliability of the energy storage device 100 and prolong the service life of the energy storage device 100. By forming the obtuse angle between the third notch wall 1671 and the fourth notch wall 1672, a smoother transition between the third notch wall 1671 and the fourth notch wall 1672 is achieved, thereby reducing internal stress of the second extending portion 165 near the corresponding second notch 167 after stamping the second notch 167. Consequently, a problem such as the upwarp of the second corner 1654 of the second extending portion 165 after stamping can be further avoided, thus preventing the second corner 1654 from scratching the tab 131. In some embodiments, a right angle is formed between the first notch wall 1661 and the second notch wall 1662, and a right angle is formed between the third notch wall 1671 and the fourth notch wall 1672. In this way, it is possible to improve the sharpness of a stamping die head, thereby reducing the difficulty in stamping the first notch 166 and the second notch 167 into shape and reducing burrs on the notch wall of each of the first notch 166 and the second notch 167.

The width W1 of the first notch 166 in the second direction Y ranges from 1.5 mm to 2.5 mm, and a length L4 of the first notch 166 in the first direction X ranges from 0.3 mm to 0.6 mm. In this way, the first corner 1644 is sufficiently shrunk inwards relative to the body 161 in the first direction X, thereby reducing the contact between the first corner 1644 and the tab 131. Therefore, it is possible to prevent the tab 131 from being damaged by the first corner 1644. The width W1 of the first notch 166 in the second direction Y may be a distance between the first notch wall 1661 and the second side wall 1642 in the second direction Y. The length L4 of the first notch 166 in the first direction X may be a distance between the second notch wall 1662 and the first side wall 1641 in the first direction X. For example, the width W1 of the first notch 166 in the second direction Y may be 1.5 mm, 2 mm, 2.5 mm, or the like. The length L4 of the first notch 166 in the first direction X may be 0.3 mm, 0.4 mm, 0.5 mm, 0.6 mm, or the like. In a case where the first notch 166 has a width W1 less than 1.5 mm and a length L4 less than 0.3 mm, on the one hand, after the robotic arm reaches the first notch 166, a clamped area of the welding protection sheet 160 by the robotic arm is insufficient, resulting in unstable clamping of the welding protection sheet 160 by the robotic arm for. As a consequence, the welding protection sheet 160 is prone to detachment, thereby lowering the production efficiency of the energy storage device 100. On the other hand, an insufficient inward shrinking of the first corner 1644 relative to the body 161 in the first direction X leads to increased contact with the tab 131, easily causing damage to the tab 131. Further, the insufficient inward shrinking may also easily cause the first corner 1644 to be in contact with other objects, resulting in the upwarp of the first corner 1644 away from the body 161 due to the external force, thereby piercing or scratching the tab. In a case where the first notch 166 has a width W1 greater than 2.5 mm and a length L4 greater than 0.6 mm, on the one hand, after placing the welding protection sheet 160 onto the tab 131, the robotic arm would easily move the welding protection sheet 160 when releasing the welding protection sheet 160, which affects the alignment precision between the welding protection sheet 160 and the tab 131, thereby lowering the reliability of the energy storage device 100. On the other hand, in a case where the first notch 166 has too large size, a connection area between the welding protection sheet 160 and the tab 131 would be reduced, leading to adverse effects on strength and stability of the connection between the welding protection sheet 160 and the tab 130 after welding the welding protection sheet to the tab.

The width W3 of the second notch 167 in the second direction Y ranges from 1.5 mm to 2.5 mm, and a length L5 of the second notch 167 in the first direction X ranges from 0.3 mm to 0.6 mm. In this way, the second corner 1654 is sufficiently shrunk relative to the body 161 in the first direction X, thus reducing contact between the second corner 1654 and the tab 131, thereby preventing the second corners 1654 from damaging the tab 131. The width W3 of the second notch 167 in the second direction Y may be a distance between the third notch wall 1671 and the fourth side wall 1652 in the second direction Y. The length LS of the second notch 167 in the first direction X may be a distance between the fourth notch wall 1672 and the third side wall 1651 in the first direction X. For example, the width W3 of the second notch 167 in the second direction Y may be 1.5 mm, 2 mm, 2.5 mm, or the like. The length L5 of the second notch 167 in the first direction X may be 0.3 mm, 0.4 mm, 0.5 mm, 0.6 mm, or the like. In a case where the second notch 167 has a width W3 less than 1.5 mm and a length L5 less than 0.3 mm, on the one hand, after the robotic arm reaches the second notch 167, the clamped area of the welding protection sheet 160 by the robotic arm is insufficient, resulting in the unstable clamping of the welding protection sheet 160 by the robotic arm. As a consequence, the welding protection sheet 160 is prone to detachment, thereby lowering the production efficiency of the energy storage device 100. On the other hand, an insufficient inward shrinking of the second corner 1654 relative to the body 161 in the first direction X leads to increased contact with the tab 131, easily causing damage to the tab 131. Further, the insufficient inward shrinking may also easily cause the second corner 1654 to be in contact with other objects, resulting in the upwarp of the second corner 1654 away from the body 161 due to the external force, thereby piercing or scratching the tab. In a case where the second notch 167 has a width W3 greater than 2.5 mm and a length L5 greater than 0.6 mm, on the one hand, after placing the welding protection sheet 160 onto the tab 131, the robotic arm may easily move the welding protection sheet 160 when releasing the welding protection sheet 160, which affects the alignment precision between the welding protection sheet 160 and the tab 131, thereby lowering the reliability of the energy storage device 100. On the other hand, in a case where the second notch 167 has too large size, the connection area between the welding protection sheet 160 and the tab 131 would be reduced, leading to harmful effects on the strength and stability of the connection between the welding protection sheet 160 and the tab 131 after welding. The distance between the first notch wall 1661 and the third notch wall 1671 in the second direction Y may range from 3 mm to 6 mm. For example, the distance between the first notch wall 1661 and the third notch wall 1671 in the second direction Y may be 3 mm, 4 mm, 5 mm, 6 mm, or the like.

In some embodiments, the distance W5 between the second side wall 1642 and the fourth side wall 1652 in the first direction X ranges from 0.05 mm to 1 mm. On the one hand, a side of the first extending portion 164 away from the first bent connection portion 162 is allowed to be in contact with the tab 131, and a side of the second extending portion 165 away from the second bent connection portion 163 is allowed to be in contact with the tab 131. Therefore, it is possible to increase a friction surface and friction force between the welding protection sheet 160 and the tab 131, which in turn avoids a slippage between the welding protection sheet 160 and the tab 131. As a result, the problem such as solder false or incorrect welding during the welding between the welding protection sheet 160 and the tab 131 is avoided, which further improves the reliability of the energy storage device 100 and prolongs service life of the energy storage device 100. On the other hand, such a design can provide a more compact structure for the welding protection sheet 160, and the welding protection sheet 160 has a uniform thickness. Therefore, uniform welding between the welding protection sheet 160 and the tab 131 can be realized, thereby strengthening connection strength therebetween. In addition, the soldier false or incorrect welding between the welding protection sheet 160 and the tab 131 can be avoided, which in turn improves the reliability of the energy storage device 100 and prolong service life of the energy storage device 100. Further, the first extending portion 164 and the second extending portion 165 may be conveniently bent relative to the body 161, to avoid generation of interference between the first extending portion 164 and the second extending portion 165, thus reducing processing difficulty of the welding protection sheet 160. Exemplarily, the distance W5 between the second side wall 1642 and the fourth side wall 1652 in the first direction X may be 0.05 mm, 0.1 mm, 0.2 mm, 0.5 mm, 1 mm, or the like. In a case where the distance between the second side wall 1642 and the fourth side wall 1652 in the first direction X is greater than 1 mm, and in a case where the welding connection piece 160 is welded to the tab 131, a corresponding position of the body 161 between the first extending portion 164 and the second extending portion 165 is easy to be burned, causing damage to the tab 131, thus affecting the production efficiency, the product reliability, and the service life of the energy storage device 100. In some embodiments, an end of the first extending portion 164 away from the first bent connection portion 162 is disposed adjacent to an end of the second extending portion 165 away from the second bent connection portion 163. A resistance increasing region 1602 with a predetermined roughness may be formed at a corresponding position of the welding protection sheet 160 between the first extending portion 164 and the second extending portion 165. In a case where the welding die head abuts the welding protection sheet 160 against the tab 131, the resistance increasing region 1602 can enlarge a friction coefficient between the welding protection sheet 160 and the welding die head or a friction coefficient between the welding protection sheet 160 and the tab 131, thereby increasing the friction force between the welding protection sheet 160 and the tab 131.

In some embodiments, in the third direction Z, the first extending portion 164 and the second extending portion 165 are attached to the body 161, respectively. In this way, it is convenient to respectively weld the first extending portion 164 and the second extending portion 165 to the body 161. Therefore, it is possible to improve the welding efficiency of the welding protection sheet 160 and the tab 131 and enhance the strength of the connection between the welding protection sheet 160 and the tab 131. In addition, it is possible to prevent dust or forging matter from entering between the first extending portion 164 and the body 161 and between the second extending portion 165 and the body 161, which would result in solder falser between the welding protection sheet 160 and the tab 131. In some embodiments, in the third direction Z, each of the first extending portion 164 and the second extending portion 165 is spaced apart from the body 161 to reduce the molding difficulty of the welding protection sheet 160.

Figure 9:
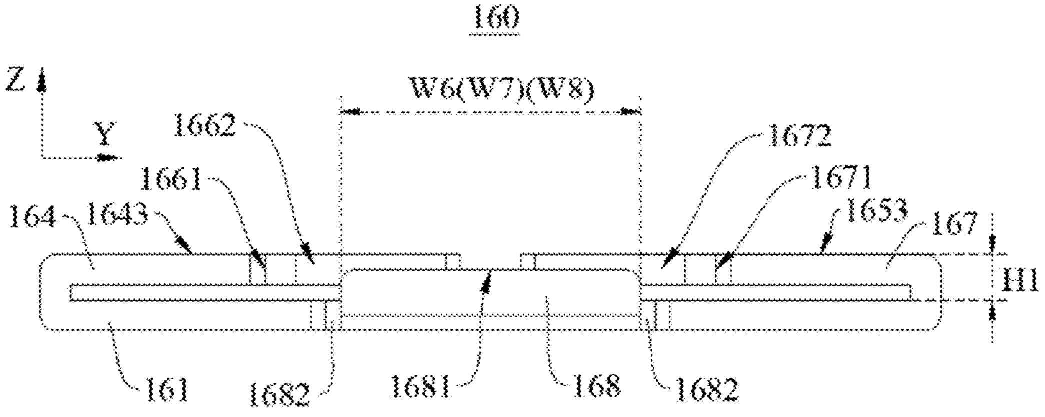
FIG. 9 is a side view of the welding protection sheet of FIG. 7.

FIG. 9 is a side view of a welding protection sheet 160 of FIG. 7. Referring to FIG. 6, FIG. 7, FIG. 8, and FIG. 9, the welding protection sheet 160 also includes a stop portion 168 connected to end portions of the body 161 in the first direction X. The body 161, the first extending portion 164, and the second extending portion 165 enclose an avoidance space 1601 at a position corresponding to each of the first notch 166 and the second notch 167 to form the avoidance space 1601. The stop portion 168 is bent relative to the body 161. The stop portion 168 is bent relative to the body 161 and extends into the avoidance space 1601. The stop portion 168 extends in the third direction Z. The third direction Z is perpendicular to both the first direction X and the second direction Y. The stop portion 168 is located at an outer side of each of the first corner 1644 and the second corner 1654 in the first direction X and can stop or shield the first corner 1644 and the second corner 1654 in the first direction X, which reduces the contact between the first corner 1644 and the tab 131 and the contact between the second corner 1654 and the tab 131. Therefore, it is possible to avoid the upwarp of the first corner 1644 and the second corner 1654 away from the body 161 due to the external force, further avoiding damage to the tab 131 caused by the first corner 1644 and the second corner 1654.

An orthographic projection of the end of the first extending portion 164 away from the first bent connection portion 162 in the first direction X overlaps with an orthographic projection of the stop portion 168 in the first direction X. The stop portion 168 may stop or shield the first corner 1644 on the first extending portion 164 in the first direction X. In this way, the contact between the first corner 1644 and the tab 131 is reduced, which in turn prevents the tab 131 from being damaged by the first corner 1644. An orthographic projection of the end of the second extending portion 165 away from the second bent connection portion 163 in the first direction X overlaps with the orthographic projection of the stop portion 168 in the first direction X. In addition, the stop portion 168 may stop or shield the second corner 1654 on the second extending portion 165 in the first direction X, thereby reducing the contact between the second corner 1654 and the tab 131, which in turn prevents the tab 131 from being damaged by the second corner 1654. In this embodiment, two stop portions 168 are provided and located at the two opposite ends of the body 161 in the first direction X, to stop or shield the two first corners 1644 of the first extending portion 164 and the two second corners 1654 of the second extending portion 165.

In the first direction X, the stop portion 168 is spaced apart from each of the first extending portion 164 and the second extending portion 165. That is, the stop portion 168 is spaced apart from each of the second notch wall 1662 and the fourth notch wall 1672, to form a stop space between the stop portion 168 and the first extending portion 164 and a stop space between the stop portion 168 and the second extending portion 165. In this way, the stop portion 168 can further stop or shield the first corner 1644 and the second corner 1654, to reduce the contact between the first corner 1644 and the tab 131 and the contact between the second corner 1654 and the tab 131, thereby avoiding the upwarp of the first corner 1644 and the second corner 1654 away from the body 161 due to the external force. Therefore, it is possible to prevent the first extending portion 164 and the second extending portion 165 from interfering with the stop portion 168 during bending, or prevent the stop portion 168 from interfering with each of the first extending portion 164 and the second extending portion 165 during bending. In some embodiments, in the second direction Y, the stop portion 168 is spaced apart from each of the first extending portion 164 and the second extending portion 165. That is, the stop portion 168 is spaced apart from each of the first notch wall 1661 and the third notch wall 1671, to facilitate bending of each of the first extending portion 164 and the second extending portion 165 relative to the body 161, thereby preventing the first extending portion 164 and the second extending portion 165 from interfering with the stop portion 168 during bending, or preventing the stop portion 168 from interfering with the first extending portion 164 and the second extending portion 165 during bending. Meanwhile, it is possible for the robotic arm to reach the first notch 166 and the second notch 167 to clamp the welding protection sheet 160.

The first extending portion 164 has a first surface 1643 located at a side of the first extending portion 164 away from the body 161. The stop portion 168 has a second surface 1681 located at a side of the stop portion 168 away from the body 161. The second extending portion 165 has a third surface 1653 located at a side of the second extending portion 165 away from the body 161. The second surface 1681 is coplanar with the first surface 1643 and/or the third surface 1653. In some embodiments, the first surface 1643, the second surface 1681, and the third surface 1653 are coplanar with each other. In this way, it is possible to avoid the upwarp of the first corner 1664 and the second corner 1654 away from the body 161 due to the external force, thereby avoiding any damage to the tab 131 caused by the first corner 1664 and the second corner 1654. In some embodiments, the second surface 1681 is coplanar with the first surface 1643 or the third surface 1653, to reduce the manufacturing difficulty of the welding protection sheet 160, thereby improving the production efficiency of the welding protection sheet.

A width W6 of the stop portion 168 in the second direction Y ranges from 1 mm to 2 mm, and a height H1 of the stop portion 168 in a third direction Z ranges from 0.15 mm to 0.25 mm. On the one hand, it is possible to prevent the stop portion 168 from affecting the clamping of the welding protection sheet 160 by the robotic arm. On the other hand, it is possible to allow the stop portion 168 to effectively stop or shield the first corner 1644 and the second corner 1654, thereby reducing the contact of each of the first corner 1644 and the second corner 1654 with the tab 131. In addition, it is possible to avoid the upwarp of the first corner 1644 and the second corner 1654 away from the body 161 due to the external force. Further, it is possible to prevent the stop portion 168 from protruding from the first extending portion 164 and the second extending portion 165, and thereby avoiding the damage to the tab 131. For example, the width W6 of the stop portion 168 in the second direction Y may be 1 mm, 1.5 mm, 2 mm, or the like. The height H1 of the stop portion 168 in the third direction Z may be 0.15 mm, 0.2 mm, 0.25 mm, or the like. In a case where the stop portion 168 has a width W6 less than 1 mm and a height H1 less than 0.15 mm, it is impossible to effectually stop or shield the first corner 1644 and the second corner 1654, resulting in the tendency of the upwarp of the first corner 1644 and the second corner 1654 away from the body 161 due to the external force. In a case where the stop portion 168 has a width W6 greater than 2 mm and a height H1 greater than 0.25 mm, on the one hand, the stop portion 168 easily stops the robotic arm, causing the robotic arm to be difficult to reach the first notch 166 and the second notch 167, thereby affecting the clamping of the welding protection sheet 160 by the robotic arm. On the other hand, in a case where the first extending portion 164 and the second extending portion 165 are bent relative to the body 161, the stop portion 168 would easily interfere with the first extending portion 164 and the second extending portion 165. Further, the stop portion 168 easily protrudes from the first extending portion 164 or the second extending portion 165 in the third direction Z, causing damage to the tab 131.

In this embodiment, a width W7 of an end of the stop portion 168 close to the body 161 in the second direction Y is equal to a width W8 of an end of the stop portion 168 away from the body 161 in the second direction Y. In this way, it is possible to reduce the molding difficulty of the stop portion 168 and facilitate stamping of the stop portion 168. The stop portion 168 and the body 161 can be integrally formed. The stop portion 168 is bent relative to the body 161. In some embodiments, each of two sides of the stop portion 168 further has a bending notch 1682 formed in the first direction X. The bending notch 1682 also penetrates the body 161 in the third direction Z. The bending notch 1682 is configured to prevent cracks from being formed at the connection between the stop portion 168 and the body 161 in a case where the stop portion 168 is bent relative to the body 161, thereby improving the strength of the connection between the stop portion 168 and the body 161 and facilitating the bending of the stop portion 168 relative to the body 161.

Figure 10:
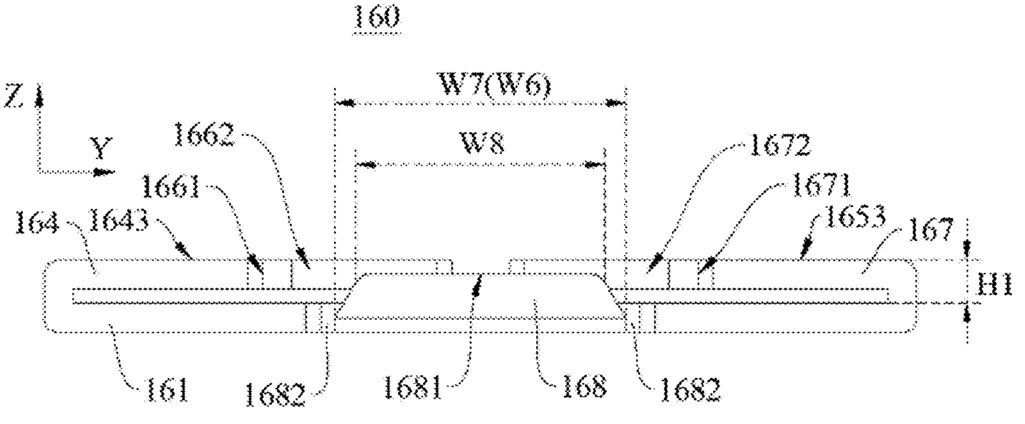
FIG. 10 is a side view of a welding protection sheet according to some embodiments of the present disclosure.

FIG. 10 is a side view of a welding protection sheet 160 according to some embodiments of the present disclosure. Referring to FIG. 10, in some embodiments, the width W7 of the end of the stop portion 168 close to the body 161 in the second direction Y is greater than the width W8 of the end of the stop portion 168 away from the body 161 in the second direction Y. In this way, it is possible to reduce sharpness of the end of the body 161 away from the body 161, thus preventing the tab 131 from being damaged by the body 161. In addition, the transition between the stop portion 168 and the body 161 becomes smooth, thereby reducing internal stress at the connection between the stop portion 168 and the body 161 after the stop portion 168 is formed through stamping. Therefore, it is possible to avoid cracking between the stop portion 168 and the body 161. In some embodiments, a rounded transition is achieved at the connection between the stop portion 168 and the body 161, thereby further reducing the internal stress at the connection between the stop portion 168 and the body 161. Two corners of a section of the stop portion 168 away from the body 161 are provided as rounded corners to avoid scratching the tab 131.

Referring to FIG. 4 and FIG. 5, in this embodiment, in a case where the welding protection sheet 160 is welded to the tab 131, both the first extending portion 164 and the second extending portion 165 face towards the tab 131. That is, the first extending portion 164 and the second extending portion 165 are located between the tab 131 and the body 161. The first extending portion 164 and the second extending portion 165 are located between the first tab portion 1311 of the tab 131 and the body 161 to allow the side of the first extending portion 164 away from the first bent connection portion 162 to be in contact with the tab 131 to increase the friction surface between the first extending portion 164 and the tab 131, and to allow the side of the second extending portion 165 away from the second bent connection portion 163 to be in contact with the tab 131 to increase the friction surface between the second extending portion 165 and the tab 131. Therefore, it is possible to increase the friction surface and friction force between the welding protection sheet 160 and the tab 131, which in turn avoids the displacement of the welding protection sheet 160 relative to the tab 131.

Referring to FIG. 7, it can be understood that the resistance increasing region 1602 with the predetermined roughness will be formed between the first extending portion 164 and the second extending portion 165. In this embodiment, the first extending portion 164 and the second extending portion 165 are located between the tab 131 and the body 161. The resistance increasing region 1602 can improve the friction coefficient between the welding protection sheet 160 and the tab 131, thereby improving the friction force between the first extending portion 164 and the tab 131 and the friction force between the second extending portion 165 and the tab 131. Therefore, it is possible to avoid the problems such as slipping and displacement during the assembling between the welding protection sheet 160 and the tab 131, thereby avoiding the problem such as solder false or incorrect welding between the welding protection sheet 160 and the tab 131. Therefore, the connection stability between the welding protection sheet 160 and the tab 131 is further improved, and the reliability of the energy storage device 100 can be improved, and service life of the energy storage device 100 can be prolonged. In addition, the first extending portion 164 and the second extending portion 165 are located between the tab 131 and the body 161. Therefore, it is also possible to prevent the first corner 1644 and the second corner 1654 from being exposed after the welding protection sheet 160 is welded to the tab 131, thereby avoiding the problem such as the upwarp of the first corner 1644 and the second corner 1654, which in turn avoids damage to the second tab portion 1312 by the first corner 1644 and the second corner 1654.

In some embodiments, in the case where the welding protection sheet 160 is welded to the tab 131, the body 161 may face towards the tab 131. That is, the first extending portion 164 and the second extending portion 165 are located at a side of the body 161 facing away from the tab 131, to improve the attachment between the welding protection sheet 160 and the tab 131, thereby improving the welding strength between the welding protection sheet 160 and the tab 131. In this way, the problems such as solder false, incorrect welding, or leakage solder between the welding protection sheet 160 and the tab 131 can be avoided. The welding reliability between the welling protection sheet 160 and the tab 131 and the use safety of the energy storage device 100 are further enhanced.

Figure 11:
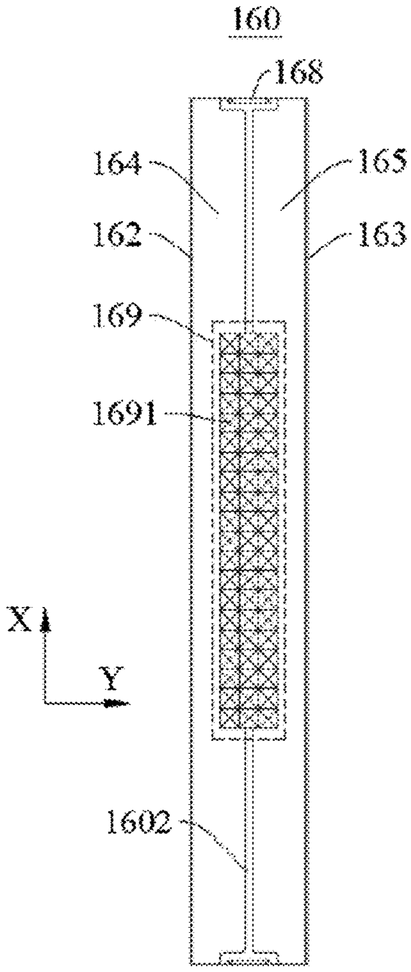
FIG. 11 is a schematic structural view of a welding protection sheet according to some other embodiments of the present disclosure.
Figure 12:
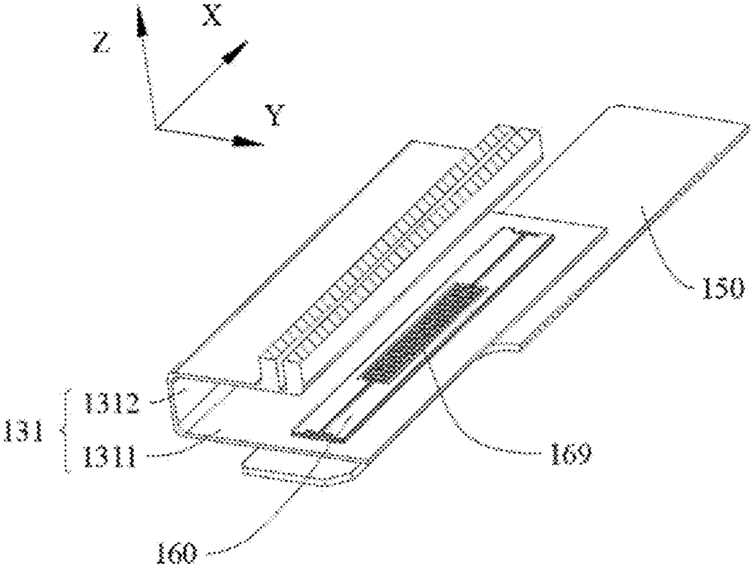
FIG. 12 is a schematic structural view of a welding protection sheet and a tab according to some other embodiments of the present disclosure.

FIG. 11 is a schematic structural view of a welding protection sheet 160 according to some other embodiments of the present disclosure. FIG. 12 is a schematic structural view of a welding protection sheet 160 and a tab 131 according to some other embodiments of the present disclosure. Referring to FIG. 11 and FIG. 12, the welding protection sheet 160 has a welding region 169. A plurality of welding spots 1691 is formed in the welding region 169. An orthographic projection of at least one of the plurality of welding spots 1691 on the body 161 in a third direction Z overlaps with an orthographic projection of each of the first extending portion 164 and the second extending portion 165 on the body 161 in the third direction Z. In this case, the first extending portion 164 is welded to the second extending portion 165 after the welding protection sheet 160 is welded to the tab 131. In this way, the welding protection sheet 160 is allowed to be uniformly welded to the tab 131, which enhances the connection strength between the welding protection sheet 160 and the tab 131 and avoids the problem such as the solder false between the welding protection sheet 160 and the tab 131. After the first extending portion 164 is welded to the second extending portion 165, conductive uniformity of the welding protection sheet 160 can also be improved, allowing resistance at the connection between the first extending portion 164 and the second extending portion 165 to be similar to or the same as that of other positions, thereby improving charging or discharging performance, the safety, and the service life of the energy storage device 100. Exemplarily, the plurality of welding spots 1691 is arranged in the first direction X to form three columns. An orthographic projection of welding spots 1691 in one column on the body 161 in the third direction Z overlaps with the orthographic projection of each of the first extending portion 164 and the second extending portion 165 on the body 161 in the third direction Z. It should be noted that, in FIG. 12, for ease of description, the welding region 169 is formed at a side of each of the first extending portion 164 and the second extending portion 165 of the welding protection sheet 160. In some embodiments, the welding region 169 may also be formed at a side of the body 161 of the welding protection sheet 160.

In the energy storage device according to the embodiments of the present disclosure, the first bent connection portion is connected between the first extending portion and the body, and the first extending portion is foldable relative to the body to face towards the body. Each of the two opposite ends of the end portion of the first extending portion away from the first bent connection portion in the first direction has the first notch. The width of the first notch in the second direction is less than the width of the first extending portion in the second direction. Further, the distance between the two first corners in the first direction is less than the length of the body in the first direction. In this way, on the one hand, a robotic arm can reach to the first notch to clamp the welding protection sheet, thereby stably clamping the welding protection sheet. In addition, it is possible to allow for rapid and accurate placement of the welding protection sheet at a specified position on the tab. Therefore, alignment efficiency and precision between the welding protection sheet and the tab can be improved, thereby improving production efficiency and product reliability of the energy storage device. Meanwhile, displacement of the welding protection sheet on the tab can be avoided, thereby avoiding problems such as solder false and solder leakage between the welding protection sheet and the tab. On the other hand, the first notch at the first extending portion can allow the first corner to be shrunk inwards relative to the body in the first direction to reduce contact between the first corner and the tab, thereby effectively preventing the tab from being damaged by the first corner. Therefore, reliability and service life of the energy storage device can be improved. Further, the shrinking of the first corners relative to the body in the first direction can also reduce the possibility of the first corners coming into contact with other objects, which can prevent the first corners from upwarping away from the body due to an external force.

Therefore, it is possible to prevent the first corners from being formed into sharp portions that could pierce or scratch the tab.

In combination with the first aspect, in some implementations of the first aspect, the welding protection sheet further includes a second bent connection portion and a second extending portion. The second extending portion extends in the first direction. The second bent connection portion is connected to an end of the body away from the first bent connection portion. The second bent connection portion is connected between the second extending portion and the body. The second extending portion is foldable relative to the body to face towards the body. The second extending portion is located at a side of the body facing towards the first extending portion. Each of two opposite ends of an end portion of the second extending portion away from the second bent connection portion in the first direction has a second notch, and a width of the second notch in the second direction is less than a width of the second extending portion in the second direction. The second extending portion has two second corners formed at connections between two end portions of the second extending portion in the first direction and the end portion of the second extending portion away from the second bent connection portion. A distance between the two second corners in the first direction is less than the length of the body in the first direction. In this way, on the one hand, the robotic arm may simultaneously reach the first notch and the second notch to clamp the welding protection sheet. The first notch and the second notch can provide the robotic arm with several clamping positions to increase an acting point of the robotic arm. Therefore, the robotic arm can clamp the welding protection sheet more steadily and allows for the rapid and accurate placement of the welding protection sheet at the specified position of the tab. Therefore, the alignment efficiency and precision between the welding protection sheet and the tab can be improved, which in turn improves the production efficiency and the product reliability of the energy storage device. Meanwhile, the displacement of the welding protection sheet on the tab can be avoided, thereby avoiding the problems such as solder false and solder leakage between the welding protection sheet and the tab. On the other hand, the second notch at the second extending portion can allow the second corner to be shrunk inwards relative to the body in the first direction to reduce contact between the second corner and the tab, thereby effectively preventing the tab from being damaged by the second corner. Therefore, reliability and service life of the energy storage device can be improved. Further, the shrinking of the second corners relative to the body in the first direction can also reduce the possibility of the second corners coming into contact with other objects, which can prevent the second corners from upwarping away from the body due to an external force. Therefore, it is possible to prevent the second corners from being formed into sharp portions that could pierce or scratch the tab.

In combination with the first aspect, in some implementations of the first aspect, the first extending portion has two first side walls opposite to each other in the first direction and a second side wall located at a side of the first extending portion away from the first bent connection portion. The first notch has a first notch wall connected to the two first side walls and a second notch wall connected to the second side wall. Rounded transitions are achieved between the first side walls and the first notch wall, between the second side wall and the second notch wall, and between the first notch wall and the second notch wall. The second extending portion has two third side walls opposite to each other in the first direction and a fourth side wall located at a side of the second extending portion away from the second bent connection portion. The second notch has a third notch wall connected to the two third side walls and a fourth notch wall connected to the fourth side wall. Rounded transitions are achieved between the third side walls and the third notch wall, between the fourth side walls and the fourth notch wall, and between the third notch wall and the fourth notch wall. Therefore, sharp corners are prevented from being formed at the first extending portion and the second extending portion, thereby avoiding any damage to the tab by the first extending portion and the second extending portion. Therefore, the reliability and service life of the energy storage device can be improved.

In combination with the first aspect, in some implementations of the first aspect, an obtuse angle or a right angle is formed between the first notch wall and the second notch wall. An obtuse angle or a right angle is formed between the third notch wall and the fourth notch wall. By forming the obtuse angle between the first notch wall and the second notch wall and forming the obtuse angle between the third notch wall and the fourth notch wall, a transition between the first notch wall and the second notch wall and a transition between the third notch wall and the fourth notch wall become smoother, thereby reducing internal stress of the first extending portion near the corresponding first notch after stamping the first notch and internal stress of the second extending portion near the corresponding second notch after stamping the second notch. Consequently, a problem such as the upwarp of the first corners and the second corners after stamping can be further avoided, thus preventing the tab from being scratched by the first corner and the second corner. Therefore, the reliability of the energy storage device can be improved and the service life of the energy storage device can be prolonged. By forming the right angle between the first notch wall and the second notch wall and forming the right angle between the third notch wall and the fourth notch wall, it is possible to improve sharpness of a stamping die head, thereby reducing the difficulty in stamping the first notch and the second notch.

In combination with the first aspect, in some implementations of the first aspect, the width of the first notch in the second direction ranges from 1.5 mm to 2.5 mm, and a length of the first notch in the first direction ranges from 0.3 mm to 0.6 mm. In addition, the width of the second notch in the second direction ranges from 1.5 mm to 2.5 mm, and a length of the second notch in the first direction ranges from 0.3 mm to 0.6 mm. In this way, the first corner and the second corner are sufficiently shrunk relative to the body, thereby reducing the contact between the first corner and the tab and the contact between the second corner and the tab. Therefore, it is possible to prevent the tab from being damaged by the first corner and the second corner. In a case where the first notch has a width less than 1.5 mm and a length less than 0.3 mm, and the second notch has a width less than 1.5 mm and a length less than 0.3 mm, on the one hand, after the robotic arm reaches the first notch and the second notch, a clamped area of the welding protection sheet by the robotic arm is insufficient, resulting in unstable clamping of the welding protection sheet by the robotic arm. As a result, the welding protection sheet is prone to falling, thereby lowering the production efficiency of the energy storage device. On the other hand, insufficient inward shrinking of the first corner and the second corner relative to the body leads to easy contact between the first corner and the tab as well as easy contact between the second corner and the tab, which would easily result in damage to the tab. Further, the insufficient inward shrinking may also easily cause the first corner and the second corner to be in contact with other objects, resulting in upwrap of the first corner and the second corner away from the body due to an external force, and such an upwrap would pierce or scratch the tab. In a case where the first notch has a width greater than 2.5 mm and a length greater than 0.6 mm, and the second notch has a width greater than 2.5 mm and a length greater than 0.6 mm, on the one hand, after placing the welding protection sheet on the tab, the robotic arm would easily move the welding protection sheet when releasing the welding protection sheet, which affects the alignment precision between the welding protection sheet and the tab, thereby lowering the reliability of the energy storage device. On the other hand, in a case where the first notch and second notch has too large size, a connection area between the welding protection sheet and the tab would be reduced, leading to adverse effects on strength and stability of the connection between the welding protection sheet and the tab after welding the welding protection sheet to the tab.

In combination with the first aspect, in some implementations of the first aspect, a length of the first extending portion in the first direction ranges from 22 mm to 30 mm, and the width of the first extending portion in the second direction ranges from 3 mm to 9 mm. In addition, a length of the second extending portion in the first direction ranges from 22 mm to 30 mm, and the width of the second extending portion in the second direction ranges from 3 mm to 9 mm. In this way, the welding protection sheet has enough welding areas at positions respectively corresponding to the first extending portion and the second extending portion when being welded to the tab, thereby ensuring the sufficient connection strength between the welding protection sheet and the tab. Therefore, it is possible to improve the safety and reliability of the energy storage device. In addition, in a case where the first extending portion has a length less than 22 mm and a width less than 3 mm, and the second extending portion has a length less than 22 mm and a width less than 3 mm, there is too small welding area between the welding protection sheet and the tab, leading to an inadequate connection strength between the welding protection sheet and the tab, which may affect the reliability and service life of the energy storage device. In addition, in a case where the first extending portion has a length greater than 30 mm and a width greater than 9 mm, and the second extending portion has a length greater than 30 mm and a width greater than 9 mm, the energy storage device may not have a compact design, resulting in a low energy density of the energy storage device.

In combination with the first aspect, in some implementations of the first aspect, the first extending portion and the second extending portion are located between the tab and the body, allowing a side of the first extending portion away from the first bent connection portion to be in contact with the tab to increase a friction surface between the first extending portion and the tab, and allowing a side of the second extending portion away from the second bent connection portion to be in contact with the tab to increase a friction surface between the second extending portion and the tab. Therefore, it is possible to increase a friction surface and a friction force between the welding protection sheet and the tab, which in turn avoids displacement of the welding protection sheet relative to the tab. Further, a resistance increasing region with a predetermined roughness may be formed at a corresponding position on the welding protection sheet between the first extending portion and the second extending portion. In this way, the resistance increasing region can increase a friction coefficient between the welding protection sheet and the tab and the friction force between the welding protection sheet and the tab. Therefore, it is possible to avoid sideslip or displacement between the welding protection sheet and the tab during the pressing and assembling therebetween, thereby avoiding solder false or incorrect welding during welding between the welding protection sheet and the tab. Therefore, the reliability of the energy storage device can be further improved, and the service life of the energy storage device can be further prolonged.

In combination with the first aspect, in some implementations of the first aspect, a distance between the second side wall and the fourth side wall in the first direction ranges from 0.05 mm to 1 mm. In this way, on the one hand, the side of the first extending portion away from the first bent connection portion is allowed to be in contact with the tab, and the side of the second extending portion away from the second bent connection portion is allowed to be in contact with the tab, thereby increasing the friction surface and friction force between the welding protection sheet and the tab, which in turn avoids the slippage between the welding protection sheet and the tab. As a result, the solder false or incorrect welding during the welding between the welding protection sheet and the tab can be avoided, which further improves the reliability of the energy storage device and prolong service life of the energy storage device. On the other hand, such a design can provide a more compact structure for the welding protection sheet, and welding protection sheet has a uniform thickness. Therefore, uniform welding between the welding protection sheet and the tab can be realized, thereby strengthening the connection strength therebetween. In addition, the solder false or solder leakage between the welding protection sheet and the tab can be avoided, which in turn improves the reliability of the energy storage device and prolongs service life of the energy storage device. In addition, in a case where the distance between the second side wall and the fourth side wall is greater than 1 mm, a corresponding part of the body between the first extending portion and the second extending portion is easy to be burned in a case where the welding protection sheet is welded to the tab, result in damage to the tab, which would affect the production efficiency, the product reliability, and the service life of the energy storage device.

In combination with the first aspect, in some implementations of the first aspect, the first extending portion and the second extending portion are attached to the body, respectively. In this way, it is possible to prevent dust or foreign matter from enter between the first extending portion and the body and between the second extending portion and the body, which would result in solder falser between the welding protection sheet and the tab.

In combination with the first aspect, in some implementations of the first aspect, the welding protection sheet further includes a stop portion connected to end portions of the body in the first direction. The body, the first extending portion, and the second extending portion enclose an avoidance space at a position corresponding to the first notch and the second notch. The stop portion is bent relative to the body and extends into the avoidance space. The stop portion may serve as a stop or shield for the first corner at the first extending portion and the second corner at the second extending portion in the first direction, thereby reducing the contact between the first corner and the tab and the contact between the second corner and the tab. In addition, it is possible to prevent the first corner and the second corner from upwarping away from the body due to an external force, thereby avoiding any damage to the tab by the first corner and the second corner.

In combination with the first aspect, in some implementations of the first aspect, the stop portion is spaced apart from each of the first extending portion and the second extending portion in the first direction, to form a stop space between the stop portion and the first extending portion and a stop space between the stop portion and the second extending portion. In this way, the stop portion can further provide the first corner and the second corner with stopping or shielding, to reduce the contact between the first corner and the tab as well as the contact between the second corner and the tab. Therefore, it is possible to prevent the first corner and the second corner from upwarping away from the body due to the external force. Further, it is possible to prevent the first extending portion and the second extending portion from interfering with the stop portion during bending.

In combination with the first aspect, in some implementations of the first aspect, the first extending portion has a first surface located at a side of the first extending portion away from the body, and the stop portion has a second surface located at a side of the stop portion away from the body. The second extending portion has a third surface located at a side of the second extending portion away from the body. The second surface is coplanar with the first surface and/or the third surface. In this way, it is possible to avoid the upwrap of the first corner and the second corner away from the body due to the external force, thereby avoiding any damage to the tab by the first corner and the second corner.

In combination with the first aspect, in some implementations of the first aspect, a width of an end of the stop portion close to the body in the second direction is greater than or equal to a width of an end of the stop portion away from the body in the second direction. In this way, it is possible to reduce sharpness of the end of the stop portion away from the body, thereby avoid the damage to the tab by the stop portion. In addition, a smoother transition can be achieved between the stop portion and the body. Therefore, it is possible to reduce an internal stress at the connection between the stop portion and the body after the stop portion is stamped, thereby avoiding cracks between the stop portion and the body.

In combination with the first aspect, in some implementations of the first aspect, a width of the stop portion in the second direction ranges from 1 mm to 2 mm, and a height of the stop portion in a third direction perpendicular to both the first direction and the second direction ranges from 0.15 mm to 0.25 mm. On the one hand, it is possible to prevent the stop portion from affecting the clamping of the welding protection sheet by the robotic arm. On the other hand, the stop portion can effectively stop or shield the first corner and the second corner, thereby reducing the contact of each of the first corner and the second corner with the tab. In addition, it is possible to avoid the upwap of the first corner and the second corner away from the body due to the external force. Further, it is possible to prevent the stop portion from protruding relative to the first extending portion and the second extending portion to damage the tab. In a case where the stop portion has a width less than 1 mm and a height less than 0.15 mm, the stop portion cannot effectively stop or shield the first corner and the second corner, resulting in the unwap of the first corner and the second corner away from the body due to the external force. In a case where the stop portion has a width greater than 2 mm and a height greater than 0.25 mm, on the one hand, the stop portion can easily stop the robotic arm, causing the robotic arm to be difficultly reach the first notch and the second notch, thereby affecting the clamping of the welding protection sheet by the robotic arm. On the other hand, in a case where the first extending portion and the second extending portion are bent relative to the body, the stop portion can easily interfere with the first extending portion and the second extending portion. Further, the stop portion is easy to protrude from the first extending portion or the second extending portion in the third direction, resulting in damage to the tab.

In combination with the first aspect, in some implementations of the first aspect, the first extending portion and the second extending portion are located at a side of the body facing away from the tab. In this way, it is possible to improve an attachment degree between the welding protection sheet and the tab, thereby enhancing a welding strength between the welding protection sheet and the tab. Consequently, the problems such as solder false, incorrect welding, or solder leakage between the welding protection sheet and the tab can be avoided, thereby increasing welding reliability between the welding protection sheet and the tab, as well as use safety of the energy storage device.

In combination with the first aspect, in some implementations of the first aspect, the welding protection sheet has a welding region. A plurality of welding spots is formed in welding region. An orthographic projection of at least one of the plurality of welding spots on the body in a third direction overlaps with an orthographic projection of each of the first extending portion and the second extending portion on the body in the third direction. The third direction is perpendicular to both the first direction and the second direction. In this way, after the welding protection sheet is welded to the tab, the first extending portion and the second extending portion are connected to each other through fusion welding. Therefore, the welding protection sheet is uniformly welded to the tab. Thus, the connection strength between the welding protection sheet and the tab is enhanced. In addition, the problem such as the solder false between the welding protection sheet and the tab can be avoided.

Embodiments of the present disclosure further provide an electric device. The electric device includes the energy storage device as described above. The electric device may be for example a vehicle, a ship, an airplane, or the like that needs to be powered. The energy storage device is configured to supply electric energy to the electric device, thereby prolonging a service life of the electric device.

While the specific implementations of the present disclosure have been described above, the protect scope of the present disclosure is not limited to these implementations. Various equivalent modifications or replacement variants and alternatives can be easily conceived by any of those skilled in the art without departing from the technical scope of the present disclosure. Therefore, these variants and alternatives are to be encompassed by the protect scope of present disclosure as defined by the claims as attached.

What is claimed is:

1. An energy storage device, comprising:

a connector;

a tab connected to the connector; and a welding protection sheet abutting against a surface of the tab away from the connector, wherein the welding protection sheet comprises a body, a first bent connection portion, and a first extending portion, wherein:

each of the body and the first extending portion extends in a first direction; the first bent connection portion is connected between the first extending portion and the body; and the first extending portion is foldable relative to the body to face towards the body;

each of two opposite ends of an end portion of the first extending portion away from the first bent connection portion in the first direction has a first notch, wherein the first notch has a width in a second direction less than a width of the first extending portion in the second direction, wherein the second direction is perpendicular to the first direction; and two first corners are formed at connections between two end portions of the first extending portion in the first direction and the end portion of the first extending portion away from the first bent connection portion, wherein a distance between the two first corners in the first direction is less than a length of the body in the first direction.

2. The energy storage device according to claim 1, wherein the welding protection sheet further comprises a second bent connection portion and a second extending portion, wherein:

the second extending portion extends in the first direction, and is foldable relative to the body to face towards the body, wherein the second extending portion is located at a side of the body towards the first extending portion;

the second bent connection portion is connected to an end of the body away from the first bent connection portion, and is connected between the second extending portion and the body;

each of two opposite ends of an end portion of the second extending portion away from the second bent connection portion in the first direction has a second notch, wherein the second notch has a width in the second direction less than a width of the second extending portion in the second direction; and two second corners are formed at connections between two end portions of the second extending portion in the first direction and the end portion of the second extending portion away from the second bent connection portion, wherein a distance between the two second corners in the first direction is less than the length of the body in the first direction.

3. The energy storage device according to claim 2, wherein:

the first extending portion has two first side walls opposite to each other in the first direction and a second side wall located at a side of the first extending portion away from the first bent connection portion; the first notch has a first notch wall connected to the two first side walls and a second notch wall connected to the second side wall, wherein rounded transitions are achieved between the first side walls and the first notch wall, between the second side wall and the second notch wall, and between the first notch wall and the second notch wall; and the second extending portion has two third side walls opposite to each other in the first direction and a fourth side wall located at a side of the second extending portion away from the second bent connection portion, and the second notch has a third notch wall connected to a corresponding one of the two third side walls and a fourth notch wall connected to the fourth side wall, wherein rounded transitions are achieved between the third side walls and the third notch wall, between the fourth side wall and the fourth notch wall, and between the third notch wall and the fourth notch wall.

4. The energy storage device according to claim 3, wherein:

an obtuse angle or a right angle is formed between the first notch wall and the second notch wall; and an obtuse angle or a right angle is formed between the third notch wall and the fourth notch wall.

5. The energy storage device according to claim 2, wherein:

the width of the first notch in the second direction ranges from 1.5 mm to 2.5 mm;

a length of the first notch in the first direction ranges from 0.3 mm to 0.6 mm;

the width of the second notch in the second direction ranges from 1.5 mm to 2.5 mm; and a length of the second notch in the first direction ranges from 0.3 mm to 0.6 mm.

6. The energy storage device according to claim 2, wherein:

a length of the first extending portion in the first direction ranges from 22 mm to 30 mm;

the width of the first extending portion in the second direction ranges from 3 mm to 9 mm;

a length of the second extending portion in the first direction ranges from 22 mm to 30 mm; and the width of the second extending portion in the second direction ranges from 3 mm to 9 mm.

7. The energy storage device according to claim 3, wherein the first extending portion and the second extending portion are located between the tab and the body.

8. The energy storage device according to claim 7, wherein a distance between the second side wall and the fourth side wall in the first direction ranges from 0.05 mm to 1 mm.

9. The energy storage device according to claim 2, wherein the first extending portion and the second extending portion are attached to the body, respectively.

10. The energy storage device according to claim 2, wherein:

the welding protection sheet further comprises a stop portion connected to an end portion of the body in the first direction; and the body, the first extending portion, and the second extending portion enclose an avoidance space at a position corresponding to the first notch and the second notch, wherein the stop portion is bent relative to the body and extending into the avoidance space.

11. The energy storage device according to claim 10, wherein the stop portion is spaced apart from each of the first extending portion and the second extending portion in the first direction.

12. The energy storage device according to claim 10, wherein:

the first extending portion has a first surface located at a side of the first extending portion away from the body;

the stop portion has a second surface located at a side of the stop portion away from the body;

the second extending portion has a third surface located at a side of the second extending portion away from the body; and the second surface is coplanar with the first surface and/or the third surface.

13. The energy storage device according to claim 10, wherein a width of an end of the stop portion close to the body in the second direction is greater than or equal to a width of an end of the stop portion away from the body in the second direction.

14. The energy storage device according to claim 10, wherein:

a width of the stop portion in the second direction ranges from 1 mm to 2 mm; and a height of the stop portion in a third direction ranges from 0.15 mm to 0.25 mm, wherein the third direction is perpendicular to both the first direction and the second direction.

15. The energy storage device according to claim 2, wherein the first extending portion and the second extending portion are located at a side of the body away from the tab.

16. The energy storage device according to claim 2, wherein the welding protection sheet has a welding region, wherein a plurality of welding spots is provided in the welding region, wherein an orthographic projection of at least one of the plurality of welding spots on the body in a third direction overlaps with an orthographic projection of each of the first extending portion and the second extending portion on the body in the third direction, wherein the third direction is perpendicular to both the first direction and the second direction.

17. An electric device, comprising an energy storage device, wherein the energy storage device is configured to supply electric energy to the electric device and comprises:

a connector;

a tab connected to the connector; and a welding protection sheet abutting against a surface of the tab away from the connector, wherein the welding protection sheet comprises a body, a first bent connection portion, and a first extending portion, wherein:

each of the body and the first extending portion extends in a first direction; the first bent connection portion is connected between the first extending portion and the body; and the first extending portion is foldable relative to the body to face towards the body;

each of two opposite ends of an end portion of the first extending portion away from the first bent connection portion in the first direction has a first notch, wherein the first notch has a width in a second direction less than a width of the first extending portion in the second direction, wherein the second direction is perpendicular to the first direction; and two first corners are formed at connections between two end portions of the first extending portion in the first direction and the end portion of the first extending portion away from the first bent connection portion, wherein a distance between the two first corners in the first direction is less than a length of the body in the first direction.

18. The electric device according to claim 17, wherein the welding protection sheet further comprises a second bent connection portion and a second extending portion, wherein:

the second extending portion extends in the first direction, and is foldable relative to the body and faces towards the body, wherein the second extends portion is located at a side of the body towards the first extending portion;

the second bent connection portion is connected to an end of the body away from the first bent connection portion, and is connected between the second extending portion and the body;

each of two opposite ends of an end portion of the second extending portion away from the second bent connection portion in the first direction has a second notch, wherein the second notch has a width in the second direction less than a width of the second extending portion in the second direction; and two second corners are formed at connections between two end portions of the second extending portion in the first direction and the end portion of the second extending portion away from the second bent connection portion, wherein a distance between the two second corners in the first direction is less than the length of the body in the first direction.

19. The electric device according to claim 18, wherein:

the first extending portion has two first side walls opposite to each other in the first direction and a second side wall located at a side of the first extending portion away from the first bent connection portion; the first notch has a first notch wall connected to the two first side walls and a second notch wall connected to the second side wall, wherein rounded transitions are achieved between the first side walls and the first notch wall, between the second side wall and the second notch wall, and between the first notch wall and the second notch wall; and the second extending portion has two third side walls opposite to each other in the first direction and a fourth side wall located at a side of the second extending portion away from the second bent connection portion, and the second notch has a third notch wall connected to a corresponding one of the two third side walls and a fourth notch wall connected to the fourth side wall, wherein rounded transitions are achieved between the third side walls and the third notch wall, between the fourth side wall and the fourth notch wall, and between the third notch wall and the fourth notch wall.

20. The electric device according to claim 19, wherein:

an obtuse angle or a right angle is formed between the first notch wall and the second notch wall; and an obtuse angle or a right angle is formed between the third notch wall and the fourth notch wall.

* * * * *